US012742107B2

(12) United States Patent
Nakamura et al.

(10) Patent No.: US 12,742,107 B2
(45) Date of Patent: Sep. 22, 2026

(54) AQUEOUS DISPERSION LIQUID, ADHESIVE AGENT COMPOSITION, ADHESIVE AGENT, AFFIXING MATERIAL, AND ADHESIVE TAPE

(71) Applicant: AGC Inc., Tokyo (JP)

(72) Inventors: Makito Nakamura, Chiyoda-ku (JP); Chitoshi Suzuki, Chiyoda-ku (JP); Yuki Matsumoto, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 608 days.

(21) Appl. No.: 18/339,502

(22) Filed: Jun. 22, 2023

(65) Prior Publication Data

US 2023/0348765 A1 Nov. 2, 2023

Related U.S. Application Data

(63) Continuation of application No. PCT/JP2021/048179, filed on Dec. 24, 2021.

(30) Foreign Application Priority Data

Dec. 28, 2020 (JP) ................................ 2020-218858

(51) Int. Cl.

| | |
|---|---|
| ***C09J 175/08*** | (2006.01) |
| ***C08L 75/08*** | (2006.01) |
| ***C09J 7/38*** | (2018.01) |

(52) U.S. Cl.

CPC ............ *C09J 175/08* (2013.01); *C08L 75/08* (2013.01); *C09J 7/38* (2018.01); *C09J 2301/302* (2020.08); *C09J 2301/312* (2020.08)

(58) Field of Classification Search

CPC ..................................................... C08L 75/08

See application file for complete search history.

(56) References Cited

U.S. PATENT DOCUMENTS

| | | | | |
|---|---|---|---|---|
| 3,939,105 | A * | 2/1976 | Jones, Jr. | A61L 15/425 528/48 |
| 4,182,827 | A * | 1/1980 | Jones | C08J 3/12 521/905 |
| 4,596,725 | A * | 6/1986 | Kluth | C08J 9/02 427/388.1 |
| 5,043,381 | A * | 8/1991 | Coogan | C08G 18/0866 524/839 |
| 2021/0371574 | A1 | 12/2021 | Nakamura et al. | |

FOREIGN PATENT DOCUMENTS

| | | | |
|---|---|---|---|
| JP | 2011-207969 | A | 10/2011 |
| JP | 2016-203399 | A | 12/2016 |
| JP | 2018-131500 | A | 8/2018 |
| JP | 2019-14813 | A | 1/2019 |
| JP | 2020-83901 | A | 6/2020 |
| WO | WO 2019/238760 | A1 | 12/2019 |
| WO | WO 2020/175220 | A1 | 9/2020 |

* cited by examiner

*Primary Examiner* — Wenwen Cai

(74) *Attorney, Agent, or Firm* — Oblon, McClelland, Maier & Neustadt, L.L.P.

(57) ABSTRACT

An aqueous dispersion including a hydroxyl-terminated urethane prepolymer obtained by reacting an oxyalkylene polymer A in which an average number of hydroxyl groups per molecule is more than 2.0 and 3.0 or less, an oxyalkylene polymer B in which an average number of hydroxyl groups per molecule is 1.2 or more and 2.0 or less, and a diisocyanate compound, where a content proportion of oxyethylene groups to a total amount of oxyalkylene groups in the oxyalkylene polymer A is 15% by mass or more, a content proportion of oxyethylene groups to a total amount of oxyalkylene groups in the oxyalkylene polymer B is 15% by mass or more, and a content proportion of oxyethylene groups to a total amount of oxyalkylene groups in the hydroxyl-terminated urethane prepolymer is more than 20% by mass and 70% by mass or less.

12 Claims, No Drawings

AQUEOUS DISPERSION LIQUID, ADHESIVE AGENT COMPOSITION, ADHESIVE AGENT, AFFIXING MATERIAL, AND ADHESIVE TAPE

CROSS REFERENCE TO RELATED APPLICATIONS

This application is a continuation of PCT/JP2021/048179, filed on Dec. 24, 2021, and claims priority to Japanese Patent Application No. 2020-218858, filed on Dec. 28, 2020, the entire contents of which are incorporated herein by reference.

TECHNICAL FIELD

The present invention relates to an aqueous dispersion, a pressure-sensitive adhesive composition, a pressure-sensitive adhesive, a sticky material, and a pressure-sensitive adhesive tape.

BACKGROUND ART

Conventionally, in flat panel displays (liquid crystal displays, organic electroluminescence displays, and the like) and touch panel displays in which flat panel displays and touch panels are combined, widely used in electronic equipment, for example, televisions, personal computers (PCs), mobile phones, and mobile terminals, pressure-sensitive adhesive layers formed on base materials have been widely used as surface protection films protecting the surfaces of these displays.

It is known that generally, in a pressure-sensitive adhesive composition used for producing a surface protection film, a polymer component including an acrylic polymer, a prepolymer type (see, for example, PTL1), or the like, and an organic solvent are included.

The organic solvent included in such a pressure-sensitive adhesive composition may cause the adverse effects of the emission of carbon dioxide due to disposal by incineration, and the like on the environment, an odor, health disorders, and the like, and therefore the demand for reducing the amount of an organic solvent used, included in a pressure-sensitive adhesive composition increases.

CITATION LIST

Patent Literature

PTL1: JP 2018-131500 A

SUMMARY OF INVENTION

Technical Problem

However, as a prepolymer type pressure-sensitive adhesive composition for a surface protection film, a water-based one including no organic solvent has not been obtained yet, and the development of a water-based prepolymer type pressure-sensitive adhesive composition for a surface protection film has been strongly desired over a long period. Particularly, in the applications of a surface protection film, it is assumed that the surface protection film is stuck on an article and then peeled as needed. From this, a pressure-sensitive adhesive for a surface protection film is difficult to use whether the tack is too strong or too weak, and it is necessary to achieve tack preferred for use.

In view of the problem, it is an object of the present invention to provide an aqueous dispersion which is excellent in the water solubility of solids and with which a pressure-sensitive adhesive composition excellent in coating properties can be prepared, and a pressure-sensitive adhesive excellent in tack and transparency can be adjusted, a pressure-sensitive adhesive composition containing the aqueous dispersion, a pressure-sensitive adhesive obtained by curing the pressure-sensitive adhesive composition, a sticky material including a pressure-sensitive adhesive layer including the pressure-sensitive adhesive, and a pressure-sensitive adhesive tape including a pressure-sensitive adhesive layer including the pressure-sensitive adhesive.

Solution to Problem

The present inventors have studied diligently in order to solve the problem, and as a result, found that the problem can be solved when a hydroxyl-terminated urethane prepolymer obtained by reacting an oxyalkylene polymer A in which the average number of hydroxyl groups per molecule is more than 2.0 and 3.0 or less, an oxyalkylene polymer B in which the average number of hydroxyl groups per molecule is 1.2 or more and 2.0 or less, and a diisocyanate compound is included, and the content proportion of oxyethylene groups to the total amount of oxyalkylene groups in the oxyalkylene polymer A is 15% by mass or more, the content proportion of oxyethylene groups to the total amount of oxyalkylene groups in the oxyalkylene polymer B is 15% by mass or more, and the content proportion of oxyethylene groups to the total amount of oxyalkylene groups in the hydroxyl-terminated urethane prepolymer is more than 20% by mass and 70% by mass or less. Thus, the present inventors have completed the present invention.

Specifically, the present invention is as follows.

[1] An aqueous dispersion including a hydroxyl-terminated urethane prepolymer obtained by reacting an oxyalkylene polymer A in which an average number of hydroxyl groups per molecule is more than 2.0 and 3.0 or less, an oxyalkylene polymer B in which an average number of hydroxyl groups per molecule is 1.2 or more and 2.0 or less, and a diisocyanate compound, wherein a content proportion of oxyethylene groups to a total amount of oxyalkylene groups in the oxyalkylene polymer A is 15% by mass or more, a content proportion of oxyethylene groups to a total amount of oxyalkylene groups in the oxyalkylene polymer B is 15% by mass or more, and a content proportion of oxyethylene groups to a total amount of oxyalkylene groups in the hydroxyl-terminated urethane prepolymer is more than 20% by mass and 70% by mass or less.

[2] The aqueous dispersion according to the [1], wherein the oxyalkylene polymer A includes an oxyalkylene polymer in which a number of hydroxyl groups is 3, and the oxyalkylene polymer B includes an oxyalkylene polymer in which a number of hydroxyl groups is 2.

[3] The aqueous dispersion according to the [1] or [2], wherein a mass ratio of the oxyalkylene polymer A to the oxyalkylene polymer B is from 20:80 to 60:40.

[4] The aqueous dispersion according to any of the [1] to [3], wherein an isocyanate index representing a molar ratio of isocyanate groups of the diisocyanate compound to hydroxyl groups of the oxyalkylene polymer A and the oxyalkylene polymer B is 40 or more and 90 or less.

[5] The aqueous dispersion according to any of the [1] to [4], wherein a number average molecular weight of the oxyalkylene polymer A and the oxyalkylene polymer B is 1000 to 50000.

[6] The aqueous dispersion according to any of the [1] to [5], wherein the content proportion of the oxyethylene groups to the total amount of the oxyalkylene groups in the hydroxyl-terminated urethane prepolymer is 23% by mass or more and 65% by mass or less.

[7] The aqueous dispersion according to any of the [1] to [6], wherein a weight average molecular weight of the hydroxyl-terminated urethane prepolymer is 10000 or more and 250000 or less.

[8] The aqueous dispersion according to any of the [1] to [7], wherein an average number of hydroxyl groups of the hydroxyl-terminated urethane prepolymer is 1.7 or more and less than 3.0.

[9] A pressure-sensitive adhesive composition including the aqueous dispersion according to any of the [1] to [8] and a polyisocyanate compound having three or more isocyanate groups in one molecule.

[10] The pressure-sensitive adhesive composition according to the [9], wherein the polyisocyanate compound having three or more isocyanate groups in one molecule is water-dispersible.

[11] The pressure-sensitive adhesive composition according to the [9] or [10], further including a catalyst, wherein a content of the catalyst is 0.001 parts by mass or more and 0.10 parts by mass or less based on 100 parts by mass of a total of the hydroxyl-terminated urethane prepolymer and the polyisocyanate compound having three or more isocyanate groups in one molecule.

[12] A pressure-sensitive adhesive obtained by curing the pressure-sensitive adhesive composition according to the [10] or [11].

[13] The pressure-sensitive adhesive according to the [12], wherein a content proportion of oxyethylene groups to a total amount of oxyalkylene groups in the pressure-sensitive adhesive is 10 to 70% by mass.

[14] A sticky material including a base material and a pressure-sensitive adhesive layer including the pressure-sensitive adhesive according to the [12] or

[13] provided on at least one surface of the base material.

[15] A pressure-sensitive adhesive tape including a base material and a pressure-sensitive adhesive layer including the pressure-sensitive adhesive according to the [12] or [13] provided on at least one surface of the base material.

Advantageous Effects of Invention

According to the present invention, it is possible to provide an aqueous dispersion which is excellent in the water solubility of solids and with which a pressure-sensitive adhesive composition excellent in coating properties can be prepared, and a pressure-sensitive adhesive excellent in tack and transparency can be prepared, a pressure-sensitive adhesive composition containing the aqueous dispersion, a pressure-sensitive adhesive obtained by curing the pressure-sensitive adhesive composition, a sticky material including a pressure-sensitive adhesive layer including the pressure-sensitive adhesive, and a pressure-sensitive adhesive tape including a pressure-sensitive adhesive layer including the pressure-sensitive adhesive.

DESCRIPTION OF EMBODIMENTS

The definitions and meanings of the terms herein are as follows.

As used herein, ones considered preferred can be optionally adopted, and it can be said that combinations of preferred ones are more preferred.

As used herein, the description of "XX to YY" means "XX or more and YY or less".

As used herein, for preferred numerical value ranges (for example, ranges of content), lower limit values and upper limit values described stepwise can each be independently combined. For example, from the description of "preferably 10 to 90, more preferably 30 to 60", "the preferred lower limit value (10)" and "the more preferred upper limit value (60)" can also be combined into "10 to 60". In the numerical value ranges described herein, the upper limit values or lower limit values of the numerical value ranges may be replaced by values shown in Examples.

As used herein, a "unit" constituting a polymer means an atomic group that a monomer forms by polymerization.

As used herein, an "oxyalkylene polymer" means a polymer having a polyoxyalkylene chain. A repeating unit based on an alkylene oxide is referred to as an "alkylene oxide unit".

As used herein, a "hydroxyl-terminated urethane prepolymer" refers to a compound having a hydroxyl group at least part of the ends of the molecular chain and having a urethane bond in the molecular chain, obtained by reacting an organic compound having a hydroxyl group with a diisocyanate compound. As used herein, an "isocyanate group-terminated urethane prepolymer" refers to a compound having an isocyanate group at least part of the ends of the molecular chain and having a urethane bond in the molecular chain, obtained by reacting an organic compound having two or more hydroxyl groups in one molecule with a polyisocyanate compound.

As used herein, for example, in Examples described later, an oxyalkylene polymer A1 is prepared using a polyol (initiator A) obtained by addition-reacting propylene oxide with glycerin with a KOH catalyst to a molecular weight of 3,000, and in this case, the initiator for the oxyalkylene polymer A1 means glycerin, which is a starting raw material, rather than the "polyol (initiator A)".

As used herein, when a mixture of oxyalkylene polymers A and B is purchased, the average numbers of hydroxyl groups of the oxyalkylene polymers A and B can be calculated by specifying the types and molar ratios of the initiators for the oxyalkylene polymers A and B using $^{13}$C-NMR. On the other hand, when the oxyalkylene polymers A and B are produced from initiators respectively, the numbers of hydroxyl groups of the initiators used, themselves, are the average numbers of hydroxyl groups of the oxyalkylene polymers A and B, and the average numbers of hydroxyl groups of the oxyalkylene polymers A and B can be recognized from the numbers of hydroxyl groups of the initiators used.

(Aqueous Dispersion)

The aqueous dispersion of the present invention includes a hydroxyl-terminated urethane prepolymer and water and further includes other components as needed.

The solid content of the aqueous dispersion of the present invention is preferably 10% by mass or more, more preferably 15% by mass or more, further preferably 18% by mass or more, and particularly preferably 20% by mass or more and preferably 60% by mass or less, more preferably 56% by mass or less, and particularly preferably 52% by mass or less.

When the solid content is within the range, the water dispersibility of the solids easily becomes better.

<Hydroxyl-Terminated Urethane Prepolymer>

The hydroxyl-terminated urethane prepolymer is obtained by reacting an oxyalkylene polymer A, an oxyalkylene polymer B, a diisocyanate compound, and another polyol (a polyol other than the oxyalkylene polymer A and the oxyalkylene polymer B) as an optional component. By the reaction of hydroxyl groups of the oxyalkylene polymer A and the oxyalkylene polymer B with isocyanate groups of the diisocyanate compound, urethane bonds are formed between the oxyalkylene polymer A and the oxyalkylene polymer B and the diisocyanate compound. Of the hydroxyl groups of the oxyalkylene polymer A and the oxyalkylene polymer B, the hydroxyl groups remaining unreacted with isocyanate groups of the diisocyanate compound are the hydroxyl groups at the ends of the molecular chain of the urethane prepolymer.

The content proportion of another polyol is not particularly limited as long as the function of the hydroxyl-terminated urethane prepolymer of the present invention is not inhibited. The content proportion of another polyol is preferably 30% by mass or less, more preferably 10% by mass or less, to the total amount of the oxyalkylene polymer A and the oxyalkylene polymer B.

The content of the hydroxyl-terminated urethane prepolymer in the aqueous dispersion of the present invention is preferably 10% by mass or more, more preferably 15% by mass or more, and particularly preferably 20% by mass or more and preferably 60% by mass or less, more preferably 56% by mass or less, and particularly preferably 52% by mass or less.

When the content is within the range, the water dispersibility of the hydroxyl-terminated urethane prepolymer easily becomes better, and a cleaner coating film is obtained during coating.

—Oxyalkylene Polymer A—

The oxyalkylene polymer A (hereinafter also referred to as a polymer A) is an oxyalkylene polymer in which the average number of hydroxyl groups per molecule is more than 2.0 and 3.0 or less.

The average number of hydroxyl groups per molecule of the oxyalkylene polymer A is not particularly limited as long as it is more than 2.0 and 3.0 or less. The average number of hydroxyl groups per molecule of the oxyalkylene polymer A is preferably 2.2 or more, more preferably 2.5 or more, further preferably 2.8 or more, and particularly preferably 3.0.

When the average number of hydroxyl groups of the oxyalkylene polymer A is within the range, the tack of the obtained pressure-sensitive adhesive to a base material can be in a moderate range.

The average number of hydroxyl groups per molecule of the oxyalkylene polymer A can be calculated by specifying the type(s) and molar ratio of the initiator(s) using $^{13}$C-NMR (nuclear magnetic resonance). In the analysis by $^{13}$C-NMR, characteristic peaks are seen for the initiator(s), and therefore the type(s) and molar ratio of the initiator(s) can be specified from the positions of the peaks and the peak areas.

Usually, the number of hydroxyl groups per molecule of an oxyalkylene polymer matches the number of hydroxyl groups per molecule of the initiator used when the oxyalkylene polymer is synthesized. When an oxyalkylene polymer is synthesized using, for example, glycerin, as an initiator, an oxyalkylene polymer in which the number of hydroxyl groups per molecule is 3 is usually obtained. When an oxyalkylene polymer is synthesized using, for example, pentaerythritol, as an initiator, an oxyalkylene polymer in which the number of hydroxyl groups per molecule is 4 is usually obtained. When an oxyalkylene polymer is synthesized using, for example, dipropylene glycol, as an initiator, an oxyalkylene polymer in which the number of hydroxyl groups per molecule is 2 is usually obtained.

The average number of hydroxyl groups per molecule of the oxyalkylene polymer A can also be calculated from the number(s) of hydroxyl groups per molecule based on the type(s) of the initiator(s), and the mole fraction(s) of the initiator(s). For example, when the amount of glycerin is 30 mol %, and the amount of dipropylene glycol is 70 mol %, the average number of hydroxyl groups is $3\times0.3+2\times0.7=2.3$.

The alkylene oxide used when the oxyalkylene polymer A is synthesized is not particularly limited as long as it is selected so that the content proportion of oxyethylene groups (ethylene oxide unit content) to the total amount of oxyalkylene groups in the oxyalkylene polymer A is 15% by mass or more. The alkylene oxide may be ethylene oxide alone, but the combined use of ethylene oxide and an alkylene oxide having 3 to 5 carbon atoms is preferred, and the combined use of ethylene oxide and propylene oxide is more preferred.

When two or more alkylene oxides are subjected to ring-opening addition, the arrangement of the units derived from the alkylene oxides may be a random, block, or tapered arrangement. Here, when the arrangement of ethylene oxide units and propylene oxide units is random, usually the oxyalkylene polymer A may have a block form of propylene oxide units and a random form of ethylene oxide units and propylene oxide units and may have a block form of ethylene oxide units and a random form of ethylene oxide units and propylene oxide units. When the arrangement of ethylene oxide units and propylene oxide units is a block arrangement, the oxyalkylene polymer A may have a block form of propylene oxide units, a block form of ethylene oxide units, and a block form of propylene oxide units in this order ("PO block-EO block-PO block" structure) or may have a block form of ethylene oxide units, a block form of propylene oxide units, and a block form of ethylene oxide units in this order ("EO block-PO block-EO block" structure). Further, when the arrangement of ethylene oxide units and propylene oxide units is tapered, usually the oxyalkylene polymer A has a block form of propylene oxide units, a random form of ethylene oxide units and propylene oxide units, and a block form of ethylene oxide units.

When ethylene oxide and an alkylene oxide other than ethylene oxide are used in combination as alkylene oxides, the molar ratio of the ethylene oxide unit content to the content of the units of the alkylene oxide other than ethylene oxide is not particularly limited as long as the content proportion of oxyethylene groups (ethylene oxide unit content) to the total amount of oxyalkylene groups in the oxyalkylene polymer A is 15% by mass or more. As the content proportion of oxyethylene groups (ethylene oxide unit content) increases, the hydrophilicity of the oxyalkylene polymer A tends to improve. As the content proportion of oxyethylene groups (ethylene oxide unit content) decreases, the crystallinity of the oxyalkylene polymer A tends to decrease.

For the oxyalkylene polymer A, when an ethylene oxide unit is at an end, a primary hydroxyl group is at an end, and therefore the reactivity with the diisocyanate tends to be higher than when a propylene oxide unit is at an end.

The content proportion of oxyethylene groups (ethylene oxide unit content) to the total amount of oxyalkylene groups in the oxyalkylene polymer A is not particularly limited as long as it is 15% by mass or more. The content proportion of oxyethylene groups may be 100% by mass but is preferably 16% by mass or more, more preferably 18% by mass or more, and particularly preferably 20% by mass or more and preferably 95% by mass or less, more preferably 90% by mass or less, and particularly preferably 85% by mass or less.

When the content proportion of oxyethylene groups (ethylene oxide unit content) to the total amount of oxyalkylene groups in the oxyalkylene polymer A is within the preferred range, the oxyalkylene polymer A easily becomes amorphous and is therefore easily handled, and even when the obtained pressure-sensitive adhesive is stored under high temperature and high humidity, the peelability is easily maintained (hereinafter referred to as "moist heat resistance").

The content proportion of oxyethylene groups (ethylene oxide unit content) to the total amount of oxyalkylene groups in the oxyalkylene polymer A is calculated by obtaining the monomer composition of the oxyalkylene chain using $^{13}$C-NMR. For example, when the oxyalkylene polymer A is a polyol including a propylene oxide unit and an ethylene oxide unit, the content proportion of oxyethylene groups (ethylene oxide unit content) to the total amount of oxyalkylene groups can be obtained from the area ratio of the signal of the methyl group in the propylene oxide unit to the signals of the methylene groups in the propylene oxide unit and in the ethylene oxide unit.

The number average molecular weight of the oxyalkylene polymer A is not particularly limited but is preferably 1000 or more, more preferably 3000 or more, further preferably 5000 or more, and particularly preferably 8000 or more and preferably 50000 or less, more preferably 40000 or less, further preferably 30000 or less, and particularly preferably 25000 or less. When the number average molecular weight of the oxyalkylene polymer A is within the preferred range, the flexibility of the obtained pressure-sensitive adhesive is better.

When two or more oxyalkylene polymers A are included, the number average molecular weight of each oxyalkylene polymer A is preferably within the preferred range.

The molecular weight distribution of the oxyalkylene polymer A is not particularly limited but is preferably less than 1.40, more preferably less than 1.20. By setting the molecular weight distribution of the oxyalkylene polymer A at less than 1.20, the reactivity easily becomes good, the hydroxyl-terminated urethane prepolymer can be more efficiently produced, and the viscosity of the obtained hydroxyl-terminated urethane prepolymer decreases more easily.

When two or more oxyalkylene polymers A are included, the molecular weight distribution of each oxyalkylene polymer A is preferably within the preferred range.

The number average molecular weight (hereinafter referred to as "Mn") and molecular weight distribution (hereinafter referred to as "Mw/Mn") of the oxyalkylene polymer A are values obtained by measurement by the method described below.

For several types of monodisperse polystyrene having different degrees of polymerization as standard samples for molecular weight measurement, measurement is performed using a commercial GPC measuring apparatus (HLC-8320GPC, manufactured by Tosoh Corporation), and a calibration curve is prepared based on the relationship between the molecular weight and retention time of the polystyrene. The oxyalkylene polymer A, which is a measurement sample, is diluted to 0.5% by mass with tetrahydrofuran and passed through a filter having a pore diameter of 0.5 μm, and then for the measurement sample, measurement is performed using the GPC measuring apparatus. The GPC spectrum of the measurement sample is computer-analyzed using the calibration curve to obtain the Mn and weight average molecular weight (hereinafter referred to as Mw) of the measurement sample.

The molecular weight distribution is the value calculated from the Mw and Mn and is the ratio of Mw to Mn.

The degree of unsaturation of the oxyalkylene polymer A is not particularly limited but is preferably 0.015 meq/g or less, more preferably 0.014 meq/g or less, and particularly preferably 0.013 meq/g or less. The degree of unsaturation of the oxyalkylene polymer A may be zero. When the degree of unsaturation of the oxyalkylene polymer A is equal to or less than the upper limit value, the curability of the obtained hydroxyl-terminated urethane prepolymer is better.

The degree of unsaturation of the oxyalkylene polymer A is a value measured according to the method of JIS-K1557-6: 2009.

The hydroxyl number of the oxyalkylene polymer A is not particularly limited but is preferably 2 mg KOH/g or more, more preferably 5 mg KOH/g or more, and particularly preferably 8 mg KOH/g or more and preferably 50 mg KOH/g or less, more preferably 45 mg KOH/g or less, and particularly preferably 40 mg KOH/g or less. When the hydroxyl number of the oxyalkylene polymer A is equal to or less than the upper limit value, the flexibility of the obtained pressure-sensitive adhesive is better.

The hydroxyl number of the oxyalkylene polymer A is a value measured and calculated according to the titration method of JIS K 0070: 1992.

As one aspect of the present invention, the oxyalkylene polymer A includes an oxyalkylene polymer a (hereinafter referred to as a "polymer a") in which the number of hydroxyl groups per molecule is 3. When the oxyalkylene polymer A includes the polymer a, the tack to a base material is easily in a more moderate range.

The proportion of the mass of the polymer a in the oxyalkylene polymer A is not particularly limited but is preferably 80% by mass or more, more preferably 90% by mass or more, and particularly preferably 100% by mass.

For example, the type of the initiators included in the oxyalkylene polymer A and the molar ratio thereof are specified using $^{13}$C-NMR (nuclear magnetic resonance), and as the ratio of the peak areas thereof, the proportion of the mass of the polymer a included in the oxyalkylene polymer A can be calculated.

In order to synthesize the polymer a, an initiator having three hydroxyl groups in one molecule is used. As the initiator for synthesizing the polymer a, glycerin is preferred. Glycerin is available at low cost, and the synthesis cost of the oxyalkylene polymer a can be reduced.

The alkylene oxide used for the synthesis of the polymer a is the same as the above-described alkylene oxide used when the oxyalkylene polymer A is synthesized.

When moisture is included in the raw material used for the synthesis of the oxyalkylene polymer A, the alkylene oxide can undergo addition polymerization with water as an initiator to produce a polymer in which the number of hydroxyl groups per molecule is 2 (corresponding to a polymer b described later) as a by-product. As long as the average number of hydroxyl groups of the obtained oxyalkylene polymer A is more than 2.0 and 3.0 or less, the by-product may be included in the oxyalkylene polymer A. The content of the by-product is preferably 2000 ppm or less, more preferably 1800 ppm or less, and further preferably 1500 ppm or less based on the oxyalkylene polymer A.

As the catalyst for subjecting the alkylene oxide to ring-opening addition polymerization to the initiator, a conventionally known catalyst can be used. Examples of the catalyst include alkali catalysts such as KOH, transition metal compound-porphyrin complex catalysts such as complexes obtained by reacting organoaluminum compounds with porphyrins, double metal cyanide complex catalysts (DMC catalysts), and catalysts including phosphazene compounds.

When the oxyalkylene polymer A is obtained using a double metal cyanide complex catalyst (DMC catalyst), it is preferred in that the molecular weight distribution of the obtained oxyalkylene polymer A can be narrowed, and the oxyalkylene polymer A having low viscosity is easily obtained.

For the double metal cyanide complex catalyst (DMC catalyst), a conventionally known compound can be used, and also for the method for producing the polymer using a double metal cyanide complex catalyst (DMC catalyst), a known method can be adopted. For example, the compounds and production methods disclosed in WO 2003/062301, WO 2004/067633, JP 2004-269776 A, JP 2005-015786 A, WO 2013/065802, and JP 2015-010162 A can be used.

As the method of subjecting an alkylene oxide to ring-opening addition polymerization to an initiator to obtain the oxyalkylene polymer A, a conventionally known method can be adopted. For example, the production methods disclosed in WO 2011/125951 and JP 5648797 B can be used.

—Oxyalkylene Polymer B—

The oxyalkylene polymer B (hereinafter also referred to as a polymer B) is an oxyalkylene polymer in which the average number of hydroxyl groups per molecule is 1.2 or more and 2.0 or less.

The average number of hydroxyl groups per molecule of the oxyalkylene polymer B is not particularly limited as long as it is 1.2 or more and 2.0 or less. The average number of hydroxyl groups per molecule of the oxyalkylene polymer B is preferably 1.5 or more, and more preferably 1.8 or more. The average number of hydroxyl groups per molecule of the polymer B is particularly preferably 2.0.

When the average number of hydroxyl groups of the oxyalkylene polymer B is within the preferred range, the tack of the obtained pressure-sensitive adhesive to a base material can be in a moderate range.

The average number of hydroxyl groups per molecule of the oxyalkylene polymer B can be specified in the same manner as in the case of the oxyalkylene polymer A.

The average number of hydroxyl groups per molecule of the oxyalkylene polymer B can be measured using $^{13}$C-NMR. Specifically, by specifying the type of the initiator from the peaks obtained by $^{13}$C-NMR, it is found that the average number of hydroxyl groups is 1.2 or more and 2.0 or less.

The average number of hydroxyl groups per molecule of the oxyalkylene polymer B can also be calculated from the number(s) of hydroxyl groups per molecule based on the type(s) of the initiator(s), and the mole fraction(s) of the initiator(s). For example, when the amount of propanol (n-propyl alcohol) is 30 mol %, and the amount of dipropylene glycol is 70 mol %, the average number of hydroxyl groups is $1\times0.3+2\times0.7=1.7$.

The oxyalkylene polymer B is preferably obtained by subjecting an alkylene oxide to ring-opening addition to an initiator having two hydroxyl groups in one molecule.

The alkylene oxide used when the oxyalkylene polymer B is synthesized is selected so that the content proportion of oxyethylene groups (ethylene oxide unit content) to the total amount of oxyalkylene groups in the oxyalkylene polymer B is 15% by mass or more. The alkylene oxide is not particularly limited and may be ethylene oxide alone, but the combined use of ethylene oxide and an alkylene oxide having 3 to 5 carbon atoms is preferred, and the combined use of ethylene oxide and propylene oxide is more preferred.

When two or more alkylene oxides are subjected to ring-opening addition, the arrangement of the units derived from the alkylene oxides may be a random, block, or tapered arrangement. Here, when the arrangement of ethylene oxide units and propylene oxide units is random, usually the oxyalkylene polymer B may have a block form of propylene oxide units and a random form of ethylene oxide units and propylene oxide units and may have a block form of ethylene oxide units and a random form of ethylene oxide units and propylene oxide units. When the arrangement of ethylene oxide units and propylene oxide units is a block arrangement, the oxyalkylene polymer B may have a block form of propylene oxide units, a block form of ethylene oxide units, and a block form of propylene oxide units in this order ("PO block-EO block-PO block" structure) or may have a block form of ethylene oxide units, a block form of propylene oxide units, and a block form of ethylene oxide units in this order ("EO block-PO block-EO block" structure). Further, when the arrangement of ethylene oxide units and propylene oxide units is tapered, usually the oxyalkylene polymer B has a block form of propylene oxide units, a random form of ethylene oxide units and propylene oxide units, and a block form of ethylene oxide units.

When ethylene oxide and an alkylene oxide other than ethylene oxide are used in combination as alkylene oxides, the molar ratio of the ethylene oxide unit content to the content of the units of the alkylene oxide other than ethylene oxide is not particularly limited as long as the content proportion of oxyethylene groups (ethylene oxide unit content) to the total amount of oxyalkylene groups in the oxyalkylene polymer B is 15% by mass or more. As the content proportion of oxyethylene groups (ethylene oxide unit content) increases, the hydrophilicity of the oxyalkylene polymer B tends to improve. As the content proportion of oxyethylene groups (ethylene oxide unit content) decreases, the crystallinity of the oxyalkylene polymer B tends to decrease.

For the oxyalkylene polymer B, when an ethylene oxide unit is at an end, a primary hydroxyl group is at an end, and therefore the reactivity with the diisocyanate tends to be higher than when a propylene oxide unit is at an end.

The content proportion of oxyethylene groups (ethylene oxide unit content) to the total amount of oxyalkylene groups in the oxyalkylene polymer B is not particularly limited, but is not particularly limited as long as it is 15% by mass or more. The content proportion of oxyethylene groups may be 100% by mass but is preferably 16% by amount or more, more preferably 17% by mass or more, and particularly preferably 19% by mass or more and preferably 95% by mass or less, more preferably 90% by mass or less, and particularly preferably 85% by mass or less.

When the content proportion of oxyethylene groups (ethylene oxide unit content) to the total amount of oxyalkylene groups in the oxyalkylene polymer B is within the preferred range, the moist heat resistance of the obtained pressure-sensitive adhesive is better.

The content proportion of oxyethylene groups (ethylene oxide unit content) to the total amount of oxyalkylene groups in the oxyalkylene polymer B can be calculated in the same manner as in the oxyalkylene polymer A.

For the content proportion of oxyethylene groups (ethylene oxide unit content) to the total amount of oxyalkylene groups when two or more oxyalkylene polymers B are included, the value calculated by their weighted average is preferably within the preferred range.

The Mn of the oxyalkylene polymer B is not particularly limited but is preferably 1000 or more, more preferably 3000 or more, further preferably 5000 or more, and particularly preferably 8000 or more and preferably 50000 or less, more preferably 40000 or less, further preferably 30000 or less, and particularly preferably 25000 or less. When the Mn of the oxyalkylene polymer B is within the preferred range, the flexibility of the obtained pressure-sensitive adhesive is better.

The Mw/Mn of the oxyalkylene polymer B is not particularly limited but is preferably less than 1.40, more preferably less than 1.20, further preferably less than 1.13, and particularly preferably less than 1.10. By setting the molecular weight distribution of the oxyalkylene polymer B within the range, the reactivity easily becomes good, the hydroxyl-terminated urethane prepolymer can be more efficiently produced, and the viscosity of the obtained hydroxyl-terminated urethane prepolymer decreases more easily. The Mn and Mw of the oxyalkylene polymer B can be obtained by GPC measurement by the same method as for the oxyalkylene polymer A.

The degree of unsaturation of the oxyalkylene polymer B is preferably 0.015 meq/g or less, more preferably 0.013 meq/g or less, further preferably 0.010 meq/g or less, and particularly preferably 0.008 meq/g or less. The degree of unsaturation of the oxyalkylene polymer B may be zero. When the degree of unsaturation of the oxyalkylene polymer B is equal to or less than the upper limit value, the curability of the obtained hydroxyl-terminated urethane prepolymer is better.

The hydroxyl number of the oxyalkylene polymer B is not particularly limited but is preferably 2 mg KOH/g or more, more preferably 5 mg KOH/g or more, and particularly preferably 8 mg KOH/g or more and preferably 80 mg KOH/g or less, more preferably 70 mg KOH/g or less, and particularly preferably 60 mg KOH/g or less. When the hydroxyl number of the oxyalkylene polymer B is within the preferred range, the flexibility of the obtained pressure-sensitive adhesive is better.

The degree of unsaturation and hydroxyl number of the oxyalkylene polymer B can be measured in the same manner as for the oxyalkylene polymer A.

When two or more oxyalkylene polymers B are included, the Mn, Mw/Mn, degree of unsaturation, and hydroxyl number of each oxyalkylene polymer B are preferably within the preferred ranges.

As the catalyst, an alkali catalyst such as KOH or a double metal cyanide complex catalyst (DMC catalyst) is preferably used in the same manner as in the case of the oxyalkylene polymer A.

As one aspect of the present invention, the oxyalkylene polymer B includes an oxyalkylene polymer b (hereinafter referred to as a "polymer b") in which the number of hydroxyl groups per molecule is 2. When the oxyalkylene polymer B includes the polymer b, the tack to a base material is easily in a more moderate range.

The proportion of the mass of the polymer b in the oxyalkylene polymer B is not particularly limited but is preferably 80% by mass or more, more preferably 90% by mass or more, and particularly preferably 100% by mass.

The proportion of the mass of the polymer b included in the oxyalkylene polymer B can be calculated in the same manner as in the above-described case of calculating the proportion of the mass of the polymer a included in the oxyalkylene polymer A.

In order to synthesize the polymer b, water or an initiator having two hydroxyl groups in one molecule is used. As the initiator having two hydroxyl groups in one molecule for synthesizing the polymer b, one or more selected from the group consisting of ethylene glycol, diethylene glycol, propylene glycol, and dipropylene glycol is preferred, one or more selected from the group consisting of propylene glycol and dipropylene glycol is more preferred, and propylene glycol is particularly preferred. Propylene glycol is available at low cost, and the synthesis cost of the polymer b can be reduced.

The alkylene oxide used for the synthesis of the polymer b is the same as the above-described alkylene oxide used when the oxyalkylene polymer A is synthesized, and a preferred aspect is also the same. The polymer b can be synthesized by the same method as the oxyalkylene polymer A described above.

—Another Oxyalkylene Polymer—

The aqueous dispersion of the present invention may include a reaction product obtained by reacting an oxyalkylene polymer other than the oxyalkylene polymers a and b with a diisocyanate compound. Examples of the oxyalkylene polymer other than the oxyalkylene polymer a and the oxyalkylene polymer b include an oxyalkylene polymer c (hereinafter referred to as a "polymer c") in which the number of hydroxyl groups per molecule is 4 or more, and an oxyalkylene polymer d (hereinafter referred to as a "polymer d") in which the number of hydroxyl groups per molecule is 1.

In order to synthesize the polymer c, an initiator having four or more hydroxyl groups in one molecule is used. Examples of the initiator having four or more hydroxyl groups in one molecule include tetra- and higher-hydric polyhydric alcohols such as diglycerin, pentaerythritol, dipentaerythritol, and tripentaerythritol, and sugars such as glucose, sorbitol, dextrose, fructose, sucrose, and methyl glucoside, or derivatives thereof.

In order to synthesize the polymer d, an initiator having one hydroxyl group in one molecule is used. As the initiator having one hydroxyl group in one molecule, monohydric alcohols having 2 to 4 carbon atoms are preferred, propanol (n-propyl alcohol), 2-propanol (isopropyl alcohol), 1-butanol (n-butyl alcohol), 2-butanol (sec-butyl alcohol), 2-methyl-1-propanol (isobutyl alcohol), and 2-methyl-2-propanol (tert-butyl alcohol) are more preferred, and 1-butanol (n-butyl alcohol), 2-butanol (sec-butyl alcohol), 2-methyl-1-propanol (isobutyl alcohol), and 2-methyl-2-propanol (tert-butyl alcohol) are particularly preferred, in terms of availability at low cost.

The alkylene oxide used for the synthesis of the polymer c or the polymer d is the same as the above-described alkylene oxide used when the oxyalkylene polymer A is synthesized, and a preferred aspect is also the same. The polymer c or the polymer d can be synthesized by the same method as the oxyalkylene polymer A described above.

The proportion of the total mass of the polymer c and the polymer d to the total mass of the oxyalkylene polymers A and B is preferably 20% by mass or less, more preferably 10% by mass or less, and particularly preferably 3% by mass or less, and the polymer c and the polymer d need not be included.

—Diisocyanate Compound—

The diisocyanate compound used for being reacted with the oxyalkylene polymer A and the oxyalkylene polymer B to obtain the hydroxyl-terminated urethane prepolymer is not particularly limited as long as it is an organic compound having two isocyanate groups in one molecule. Examples of the diisocyanate compound include aliphatic diisocyanate compounds, alicyclic diisocyanate compounds, aromatic diisocyanate compounds, and aromatic aliphatic diisocyanate compounds.

Examples of the aliphatic diisocyanate compounds include linear aliphatic diisocyanates such as tetramethylene diisocyanate, dodecamethylene diisocyanate, and hexamethylene diisocyanate (HDI); and branched aliphatic diisocyanates such as 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. One aliphatic diisocyanate compound can be used alone, or two or more aliphatic diisocyanate compounds can be used in combination.

Among these, linear aliphatic diisocyanates are preferred, linear aliphatic diisocyanates having 4 to 8 carbon atoms are more preferred, and hexamethylene diisocyanate (HDI) is particularly preferred, in that the glass transition temperature of the obtained pressure-sensitive adhesive is higher, and the tensile strength and the elongation percentage at break are better.

Examples of the alicyclic diisocyanate compounds include isophorone diisocyanate (IPDI), hydrogenated xylylene diisocyanate, 4,4'-dicyclohexylmethane diisocyanate, 1,4-cyclohexane diisocyanate, methylcyclohexylene diisocyanate, and 1,3-bis (isocyanatemethyl) cyclohexane. One alicyclic diisocyanate compound can be used alone, or two or more alicyclic diisocyanate compounds can be used in combination.

Among these, isophorone diisocyanate, and 4,4'-dicyclohexylmethane diisocyanate, are preferred, and isophorone diisocyanate is more preferred, in that the tensile strength and elongation percentage at break of the obtained polyurethane (pressure-sensitive adhesive) are better.

Examples of the aromatic diisocyanate compounds include tolylene diisocyanate (TDI), 2,2'-diphenylmethane diisocyanate, 2,4'-diphenylmethane diisocyanate, 4,4'-diphenylmethane diisocyanate (MDI), 4,4'-dibenzyl diisocyanate, 1,5-naphthylene diisocyanate, xylylene diisocyanate, 1,3-phenylene diisocyanate, and 1,4-phenylene diisocyanate. One aromatic diisocyanate compound can be used alone, or two or more aromatic diisocyanate compounds can be used in combination.

Among these, diphenylmethane diisocyanate is preferred, and 4,4'-diphenylmethane diisocyanate (MDI) is more preferred, in that the tensile strength and elongation percentage at break of the obtained polyurethane are better.

Examples of the aromatic aliphatic diisocyanate compounds include dialkyldiphenylmethane diisocyanate, tetraalkyldiphenylmethane diisocyanate, and $\alpha,\alpha,\alpha',\alpha'$-tetramethylxylylene diisocyanate. One aromatic aliphatic diisocyanate compound can be used alone, or two or more aromatic aliphatic diisocyanate compounds can be used in combination.

Among these, $\alpha,\alpha,\alpha',\alpha'$-tetramethylxylylene diisocyanate is preferred in that the elongation percentage at break of the obtained polyurethane is better.

For the diisocyanate compound used for the production of the hydroxyl-terminated urethane prepolymer, aliphatic diisocyanate compounds and alicyclic diisocyanate compounds are preferred, aliphatic diisocyanate compounds are more preferred, aliphatic diisocyanate compounds having 4 to 6 carbon atoms are further preferred, HDI and modified products of HDI are particularly preferred, and HDI and isocyanurate-modified products of HDI are most preferred, in that the tensile strength and elongation percentage at break of the obtained polyurethane are better.

As the diisocyanate compound for producing the hydroxyl-terminated urethane prepolymer, a bifunctional isocyanate group-terminated urethane prepolymer obtained by prepolymerizing the above-described aliphatic diisocyanate compound, alicyclic diisocyanate compound, aromatic diisocyanate compound, or aromatic aliphatic diisocyanate compound with a diol may be used.

Examples of the diol for producing the isocyanate group-terminated urethane prepolymer include ethylene glycol, propylene glycol, 1,4-butanediol, 1,5-pentanediol, 3-methyl-1,5-pentanediol, and 1,6-hexanediol. One diol can be used alone, or two or more diols can be used in combination.

Among these, ethylene glycol, propylene glycol, 1,4-butanediol, 1,5-pentanediol, 3-methyl-1,5-pentanediol, and 1,6-hexanediol are preferred, and propylene glycol is more preferred, in that the glass transition temperature of the obtained polyurethane (pressure-sensitive adhesive) is higher.

The isocyanate index when the isocyanate group-terminated urethane prepolymer is produced is more than 100. The isocyanate index is the value obtained by centupling the ratio of the number of moles of the isocyanate groups of the diisocyanate compound to the number of moles of the hydroxyl groups of the diol.

Examples of commercial products of the bifunctional isocyanate group-terminated urethane prepolymer include DURANATE D101, DURANATE D201, and DURANATE A201H (all are manufactured by Asahi Kasei Corporation).

The molar ratio of the isocyanate groups of the diisocyanate compound to the hydroxyl groups of the oxyalkylene polymer A and the oxyalkylene polymer B (isocyanate index) is not particularly limited but is preferably 40 or more, more preferably 43 or more, and particularly preferably 46 or more and preferably 90 or less, more preferably 80 or less, and particularly preferably 75 or less. When the molar ratio is within the preferred range, a hydroxyl-terminated urethane prepolymer having a moderate molecular chain length can be produced, and therefore the productivity improves more. The isocyanate index is the value obtained by centupling the ratio of the number of moles of the isocyanate groups of the diisocyanate compound to the total number of moles of the hydroxyl groups of the oxyalkylene polymer A and the oxyalkylene polymer B.

—Method for Producing Hydroxyl-Terminated Urethane Prepolymer—

The method for producing the hydroxyl-terminated urethane prepolymer is not particularly limited, and examples thereof include a method of reacting the oxyalkylene polymer A and the oxyalkylene polymer B with a diisocyanate compound.

The content proportion of the oxyalkylene polymer A to the total mass of the oxyalkylene polymer A and the oxyalkylene polymer B is not particularly limited but is preferably 20% by mass or more, more preferably 24% by mass or more, and particularly preferably 28% by mass or more and preferably 60% by mass or less, more preferably 55% by mass or less, and particularly preferably 50% by mass or less. When the content proportion of the oxyalkylene polymer A to the total mass of the oxyalkylene polymer A and the oxyalkylene polymer B is within the preferred range, gelation and high viscosity in the production of the urethane prepolymer can be prevented, and the tackiness to a base material can be kept better.

The average number of hydroxyl groups of the hydroxyl-terminated urethane prepolymer is preferably 1.7 or more, more preferably 1.8 or more, and particularly preferably 2.0 or more and preferably less than 3.0, more preferably 2.9 or less, and particularly preferably 2.5 or less. When the average number of hydroxyl groups of the hydroxyl-terminated urethane prepolymer is within the preferred range, the transmission properties of the obtained pressure-sensitive adhesive and the tackiness of the obtained pressure-sensitive adhesive to a base material can be kept better.

"The average number of hydroxyl groups, f," of the hydroxyl-terminated urethane prepolymer is the value obtained by the following formula (I):

$$f=(\text{the average number of hydroxyl groups of the oxyalkylene polymer } A)\times(\text{the number of moles of the oxyalkylene polymer } A \text{ to the total number of moles of the oxyalkylene polymer } A \text{ and the oxyalkylene polymer } B)+(\text{the average number of hydroxyl groups of the oxyalkylene polymer } B)\times(\text{the number of moles of the oxyalkylene polymer } B \text{ to the total number of moles of the oxyalkylene polymer } A \text{ and the oxyalkylene polymer } B) \quad \text{(I)}$$

In the hydroxyl-terminated prepolymer, a polyol other than an oxyalkylene polymer can also be used in combination as an optional component.

Examples of the polyol other than an oxyalkylene polymer include polyester polyols, poly(meth)acrylic polyols, polycarbonate polyols, polyolefin polyols, and castor oil-based polyols, and those described in [0016] to [0028] of JP 2020-37689 A can be used without particular limitation. A polymer polyol in which a polymer having a unit based on a (meth)acrylate monomer is dispersed in a polyether polyol can also be used. The polymer polyol may be a commercial product, and examples thereof include the "ULTIFLOW (registered trademark)" series and the "SHARPFLOW (registered trademark)" series (the above are manufactured by Sanyo Chemical Industries, Ltd.), and the "EXCENOL (registered trademark)" series (manufactured by AGC).

For the production of the hydroxyl-terminated urethane prepolymer, a catalyst can be used as needed.

Examples of the catalyst include tertiary amine-based compounds; tin-based compounds; and non-tin-based compounds.

One catalyst can be used alone, or two or more catalysts can be used in combination.

Examples of the tertiary amine-based compounds include triethylamine, triethylenediamine, and 1,8-diazabicyclo(5,4,0)-7-undecene (DBU).

Examples of the tin-based compounds include dibutyltin dichloride, dibutyltin oxide, dibutyltin dibromide, dibutyltin dimaleate, dibutyltin dilaurate (DBTDL), dibutyltin diacetate, dibutyltin sulfide, tributyltin sulfide, tributyltin oxide, tributyltin acetate, triethyltin ethoxide, tributyltin ethoxide, dioctyltin oxide, tributyltin chloride, tributyltin trichloroacetate, and tin 2-ethylhexanoate.

Examples of the non-tin-based compounds include titanium-based compounds such as dibutyltitanium dichloride, tetrabutyl titanate, and butoxytitanium trichloride; lead-based compounds such as lead oleate, lead 2-ethylhexanoate, lead benzoate, and lead naphthenate; iron-based compounds such as iron 2-ethylhexanoate and iron acetylacetonate; cobalt-based compounds such as cobalt benzoate and cobalt 2-ethylhexanoate; zinc-based compounds such as zinc naphthenate and zinc 2-ethylhexanoate; and zirconium-based compounds such as zirconium naphthenate.

The amount of the catalyst used when the catalyst is used is not particularly limited but is preferably 0.001 parts by mass or more, more preferably 0.002 parts by mass or more, and particularly preferably 0.003 parts by mass or more and preferably 1.0 part by mass or less, more preferably 0.2 parts by mass or less, and particularly preferably 0.05 parts by mass or less based on 100 parts by mass of the total of the oxyalkylene polymer A and the oxyalkylene polymer B and the diisocyanate compound.

For the production of the hydroxyl-terminated urethane prepolymer, a solvent can be used as needed.

Examples of the solvent include ketones such as acetone and methyl ethyl ketone; esters such as ethyl acetate; and aromatic hydrocarbons such as toluene and xylene. One solvent can be used alone, or two or more solvents can be used in combination.

The amount of the solvent used when the solvent is used is not particularly limited but is preferably 30 parts by mass or more, more preferably 40 parts by mass or more, and particularly preferably 50 parts by mass or more and preferably 500 parts by mass or less, more preferably 450 parts by mass or less, and particularly preferably 400 parts by mass or less based on 100 parts by mass of the total of the oxyalkylene polymers and the diisocyanate compound.

Examples of the method for producing the hydroxyl-terminated urethane prepolymer include the methods described below.

Production method 1: a method of charging a diisocyanate compound, the oxyalkylene polymer A and the oxyalkylene polymer B, an optional catalyst, and an optional solvent together Production method 2: a method of charging the oxyalkylene polymer A and the oxyalkylene polymer B, an optional catalyst, and an optional solvent, and adding a diisocyanate compound dropwise thereto In the case of the production method 2, the low molecular components in the raw materials are preferentially reacted, the molecular weight distribution can be more narrowed, and the reaction is easily controlled.

The reaction temperature is preferably 50° C. or more, more preferably 60° C. or more, and particularly preferably 65 or more and less than 100° C., more preferably 95° C. or less, and particularly preferably 80° C. or less. When the reaction temperature is within the range, side reactions other than the urethane reaction are easily suppressed, and therefore the desired prepolymer is easily obtained.

After the completion of the reaction, a reaction terminating agent may be added to deactivate the catalyst. Examples of the reaction terminating agent include acetylacetone. Two or more reaction terminating agents may be used in combination.

The Mw of the hydroxyl-terminated urethane prepolymer is not particularly limited but is preferably 10000 or more, more preferably 15000 or more, and particularly preferably 20000 or more and preferably 250000 or less, more preferably 240000 or less, and particularly preferably 220000 or less. When the weight average molecular weight is within the preferred range, a pressure-sensitive adhesive composition excellent in coating properties is obtained, and the viscosity during the synthesis can be adjusted.

The Mw of the hydroxyl-terminated urethane prepolymer can be obtained by GPC measurement by the same method as for the oxyalkylene polymer A.

The content proportion of oxyethylene groups (ethylene oxide unit content) to the total amount of oxyalkylene groups in the hydroxyl-terminated urethane prepolymer is not particularly limited as long as it is more than 20% by mass and 70% by mass or less. The content proportion of oxyethylene groups is preferably 23% by mass or more, more preferably 26% by mass or more, and particularly preferably 29% by mass or more and preferably 65% by mass or less, more preferably 60% by mass or less, and particularly preferably 55% by mass or less. When the content proportion of oxyethylene groups (ethylene oxide unit content) to the total amount of oxyalkylene groups in the hydroxyl-terminated urethane prepolymer is equal to or more than the lower limit value, the water solubility of the hydroxyl-terminated urethane prepolymer is improved, the affinity for a release agent (silicone) is increased by the presence of oxypropylene groups (polar groups) in the prepolymer to improve the coating properties of the water dispersion including the hydroxyl-terminated urethane prepolymer, and further the transparency of the obtained pressure-sensitive adhesive is more improved, and the moist heat resistance of the obtained pressure-sensitive adhesive is better. When the content proportion of oxyethylene groups (ethylene oxide unit content) to the total amount of oxyalkylene groups in the hydroxyl-terminated urethane prepolymer is equal to or less than the upper limit value, the haze of the obtained pressure-sensitive adhesive is easily suppressed, and the transparency improves easily.

The content proportion of oxyethylene groups (ethylene oxide unit content) to the total amount of oxyalkylene groups in the urethane prepolymer is calculated by obtaining the monomer compositions of the oxyalkylene chains using $^{1}$H-NMR.

When the raw materials and the amounts used during the synthesis are known, the content proportion of oxyethylene groups (ethylene oxide unit content) to the total amount of oxyalkylene groups in the hydroxyl-terminated urethane prepolymer can be calculated as (the content proportion of oxyethylene groups to the total amount of oxyalkylene groups in the oxyalkylene polymer A)×(the mass of the oxyalkylene polymer A to the total mass of the oxyalkylene polymer A and the oxyalkylene polymer B)+(the content proportion of oxyethylene groups to the total amount of oxyalkylene groups in the oxyalkylene polymer B)×(the mass of the oxyalkylene polymer B to the total mass of the oxyalkylene polymer A and the oxyalkylene polymer B)

<Water>

The content of water in the aqueous dispersion of the present invention is preferably 40% by mass or more, more preferably 44% by mass or more, and particularly preferably 48% by mass or more and preferably 90% by mass or less, more preferably 85% by mass or less, and particularly preferably 80% by mass or less.

When the content is within the range, the coating properties are more improved.

<Other Components>

The aqueous dispersion of the present invention may include as other components an antioxidant; an organic solvent such as an alcohol; and the raw materials used when the hydroxyl-terminated urethane prepolymer is prepared, such as the alkylene oxide, the polyols (initiators), and the diisocyanate.

The content of other components in the aqueous dispersion of the present invention is usually 20% by mass or less.

—Antioxidant—

Examples of the antioxidant include radical scavengers such as phenol-based compounds and amine-based compounds; and peroxide decomposers such as sulfur-based compounds and phosphorus-based compounds. One antioxidant can be used alone, or two or more antioxidants can be used in combination.

——Phenol-Based Compounds——

Examples of the phenol-based compounds include 2,6-di-t-butyl-p-cresol, butylated hydroxyanisole, 2,6-di-t-butyl-4-methylphenol, 2,6-di-t-butyl-4-ethylphenol, stearin-β-(3,5-di-t-butyl-4-hydroxyphenyl)propionate, 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis(3-methyl-6-t-butylphenol), 2,2'-dihydroxy-3,3'-di(α-methylcyclohexyl)-5,5'-dimethyldiphenylmethane (Seiko Chemical product name CBP) 3,9-bis[1,1-dimethyl-2-[β-(3-t-butyl-4-hydroxy-5-methylphenyl)propionyloxy]ethyl]2,4,8,10-tetraoxaspiro[5,5]undecane, benzenepropanoic acid, 3,5-bis(1,1-dimethylethyl)-4-hydroxy-,C7-C9 side chain alkyl esters (BASF product name Irganox 1135), 2,6-di-t-butyl-4-(4,6-bis(octylthio)-1,3,5-triazin-2-ylamino)phenol (BASF product name Irganox 565), 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis-[methylene-3-(3',5'-di-t-butyl-4'-hydroxyphenyl)propionate]methane, bis[3,3'-bis-(4'-hydroxy-3'-t-butylphenyl)butyric acid]glycol ester, 1,3,5-tris(3',5'-di-t-butyl-4'-hydroxybenzyl)-S-triazine-2,4,6-(1H,3H,5H)trione, and tocophenol.

——Phosphorus-Based Compounds——

Examples of the phosphorus-based compounds include triphenyl phosphite, diphenyl isodecyl phosphite, 4,4'-butylidene-bis(3-methyl-6-tert-butylphenyl ditridecyl)phosphite, cyclic neopentanetetrayl bis(octadecyl phosphite), tris(nonylphenyl)phosphite, tris(monononylphenyl)phosphite, tris(dinonylphenyl)phosphite, diisodecyl pentaerythritol diphosphite, 9,10-dihydro-9-oxa-10-phosphaphenanthrene-10-oxide, 10-(3,5-di-tert-butyl-4-hydroxybenzyl)-9,10-dihydro-9-oxa-10-phosphaphenanthrene-10-oxide, 10-decyloxy-9,10-dihydro-9-oxa-10-phosphaphenanthrene, tris(2,4-di-tert-butylphenyl)phosphite, cyclic neopentanetetrayl bis(2,4-di-tert-butylphenyl)phosphite, cyclic neopentanetetrayl bis(2,6-di-tert-butyl-4-methylphenyl)phosphite, and 2,2-methylenebis(4,6-di-tert-butylphenyl)octyl phosphite.

By using the antioxidant, the thermal deterioration of the hydroxyl-terminated urethane prepolymer can be prevented.

The amount of the antioxidant added is not particularly limited but is preferably 0.01 parts by mass or more, more preferably 0.1 parts by mass or more, and particularly preferably 0.2 parts by mass or more and preferably 5 parts by mass or less, more preferably 3 parts by mass or less, and particularly preferably 2 parts by mass or less based on 100 parts by mass of the hydroxyl-terminated urethane prepolymer.

As the antioxidant, one or more phenol-based compounds, which are radical scavengers, are preferably used from the viewpoint of stability and an oxidation prevention effect. It is also possible to use one or more phenol-based compounds, which are radical scavengers, and one or more phosphorus-based compounds, which are peroxide decomposers, in combination. It is also possible to use a phenol-based compound, which is a radical scavenger, and a phosphorus-based compound, which is a peroxide decomposer, in combination as antioxidants and use these antioxidants and a hydrolysis inhibitor described later in combination.

(Pressure-Sensitive Adhesive Composition)

The pressure-sensitive adhesive composition of the present invention includes the aqueous dispersion of the present invention and a polyisocyanate compound having three or more isocyanate groups in one molecule.

<Polyisocyanate Compound Having Three or More Isocyanate Groups in One Molecule>

Examples of the polyisocyanate compound having three or more isocyanate groups in one molecule include isocyanurate-modified products of the above-described diisocyanate compounds; biuret-modified products of the above-described diisocyanate compounds; allophanate-modified products of the above-described diisocyanate compounds; tri- and higher functional isocyanate group-terminated urethane prepolymers (adduct-modified products) obtained by reacting the above-described diisocyanate compounds with polyols having three or more hydroxyl groups in one molecule; and water-dispersible polyisocyanate compounds such as water-dispersible isocyanates and block isocyanates.

Examples of commercial products of the isocyanurate-modified products include DURANATE TPA-100 and DURANATE TKA-100 (manufactured by Asahi Kasei Corporation) and Coronate HX (manufactured by Tosoh Corporation).

Examples of commercial products of the biuret-modified products include DURANATE 24A-100 and DURANATE 22A-75P (manufactured by Asahi Kasei Corporation).

Examples of commercial products of the tri- and higher functional isocyanate group-terminated urethane prepolymers include Coronate L, Coronate L-55E, and Coronate L-45E (all are manufactured by Tosoh Corporation).

Examples of commercial products of the water-dispersible isocyanates include DURANATE WB40-100, DURANATE WB40-80D, DURANATE WT20-100, DURANATE WL70-100, DURANATE WE50-100, and DURANATE WR80-70P (manufactured by Asahi Kasei Corporation), and Aquanate 105, Aquanate 130, Aquanate 140 (AQ-140), Aquanate 200, and Aquanate 210 (manufactured by Tosoh Corporation).

Examples of commercial products of the block isocyanates include SU-268A, NBP-211, MEIKANATE CX, MEIKANATE TP-10, and DM-6400 (all are manufactured by Meisei Chemical Works, Ltd.); WM44-L70G (manufactured by Asahi Kasei Corporation); Aqua BI200 and Aqua BI220 (all are manufactured by Baxenden chemicals); TAKELAC W and TAKELAC WPB (all are manufactured by Mitsui Chemicals, Inc.); BURNOCK (manufactured by DIC CORPORATION); and ELASTRON (manufactured by DKS Co. Ltd.).

Among these, water-dispersible polyisocyanate compounds are preferred, and water-dispersible isocyanates are more preferred.

The pressure-sensitive adhesive composition of the present invention may be a two-component pressure-sensitive adhesive composition including a first agent including the aqueous dispersion of the present invention, and a second agent including a polyisocyanate compound having three or more isocyanate groups in one molecule.

By mixing the first agent and the second agent, the formation of urethane bonds proceeds, and a pressure-sensitive adhesive composition including a polyurethane is obtained.

The first agent or the second agent may further include a catalyst, a solvent, and optional components that can be blended into the pressure-sensitive adhesive composition described later.

The first agent and the second agent are stored in different containers respectively. For the containers, various ones such as tubes and bottles can be utilized.

The form of the sale of the pressure-sensitive adhesive composition of the present invention may be a form in which the pressure-sensitive adhesive composition of the present invention includes the first agent but does not include the second agent (that is, the aqueous dispersion of the present invention), in addition to the form in which the pressure-sensitive adhesive composition of the present invention includes the first agent and the second agent. In the form of sale in which the pressure-sensitive adhesive composition of the present invention does not include the second agent, by using the second agent separately provided by a user, the flexibility of the user increases.

<Method for Producing Pressure-Sensitive Adhesive Composition>

A method of reacting the aqueous dispersion of the present invention with a curing agent including a polyisocyanate compound having three or more isocyanate groups in one molecule to produce the pressure-sensitive adhesive composition of the present invention will be described.

The curing agent may include a polyisocyanate compound (diisocyanate compound) having two isocyanate groups in one molecule, in addition to the polyisocyanate compound having three or more isocyanate groups in one molecule.

Examples of the diisocyanate compound include the above-described diisocyanate compounds and the above-described bifunctional isocyanate group-terminated urethane prepolymers.

When the aqueous dispersion of the present invention is reacted with a curing agent including a polyisocyanate compound having three or more isocyanate groups in one molecule to produce the pressure-sensitive adhesive composition of the present invention, the isocyanate index is preferably more than 100, more preferably 105 or more, and particularly preferably 150 or more and preferably 2000 or less, more preferably 1750 or less, and particularly preferably 1500 or less. The isocyanate index is the value obtained by centupling the ratio of the number of moles of the isocyanate groups of the curing agent to the number of moles of the hydroxyl groups of the hydroxyl-terminated urethane prepolymer.

When the pressure-sensitive adhesive composition of the present invention is produced, a curing catalyst can be used as needed. For the types of the curing catalyst, the above-described catalysts are preferred. The amount of the curing catalyst used is preferably 0.001 parts by mass or more, more preferably 0.003 parts by mass or more, and particularly preferably 0.005 parts by mass or more and preferably 0.10 parts by mass or less, more preferably 0.05 parts by mass or less, and particularly preferably 0.01 parts by mass or less based on 100 parts by mass of the total of the hydroxyl-terminated urethane prepolymer and the curing agent. After the completion of the reaction, a reaction terminating agent is preferably added to deactivate the catalyst.

A solvent may be included in the pressure-sensitive adhesive composition of the present invention as needed. For the types of the solvent, the above-described solvents are preferred. The amount of the solvent used is preferably 30 parts by mass or more, more preferably 40 parts by mass or more, and particularly preferably 50 parts by mass or more and preferably 500 parts by mass or less, more preferably 450 parts by mass or less, and particularly preferably 400 parts by mass or less based on 100 parts by mass of the total of the hydroxyl-terminated urethane prepolymer and the curing agent.

The reaction temperature when the aqueous dispersion of the present invention and the curing agent are subjected to a crosslinking reaction is preferably 30° C. or more, more preferably 35° C. or more, and particularly preferably 40° C. or more and less than 100° C., more preferably 80° C. or less, and particularly preferably 60° C. or less. When the reaction temperature is within the range, side reactions other than the urethane reaction are easily suppressed, and therefore the desired polymer is easily obtained.

<Optional Components that can be Blended into Pressure-Sensitive Adhesive Composition>

The pressure-sensitive adhesive composition of the present invention can include a hydrolysis inhibitor, an antioxidant, an ultraviolet absorbing agent, a light stabilizer, an antistatic agent, a leveling agent, and other optional components as needed, in a range that does not impair the effect of the present invention.

—Hydrolysis Inhibitor—

Examples of the hydrolysis inhibitor include carbodiimide-based, isocyanate-based, oxazoline-based, and epoxy-based hydrolysis inhibitors. One hydrolysis inhibitor can be used alone, or two or more hydrolysis inhibitors can be used in combination.

Among these, carbodiimide-based hydrolysis inhibitors are preferred from the viewpoint of a hydrolysis suppression effect.

——Carbodiimide-Based Hydrolysis Inhibitors——

The carbodiimide-based hydrolysis inhibitors are compounds having one or more carbodiimide groups in one molecule.

Examples of monocarbodiimide compounds include dicyclohexylcarbodiimide, diisopropylcarbodiimide, dimethylcarbodiimide, diisobutylcarbodiimide, dioctylcarbodiimide, diphenylcarbodiimide, and naphthylcarbodiimide.

Polycarbodiimide compounds can be produced by subjecting a diisocyanate to a decarboxylation condensation reaction in the presence of a carbodiimidization catalyst.

Examples of the diisocyanate include 4,4'-diphenylmethane diisocyanate, 3,3'-dimethoxy-4,4'-diphenylmethane diisocyanate, 3,3'-dimethyl-4,4'-diphenylmethane diisocyanate, 4,4'-diphenyl ether diisocyanate, 3,3'-dimethyl-4,4'-diphenyl ether diisocyanate, 2,4-tolylene diisocyanate, 2,6-tolylene diisocyanate, 1-methoxyphenyl-2,4-diisocyanate, isophorone diisocyanate, 4,4'-dicyclohexylmethane diisocyanate, and tetramethylxylylene diisocyanate.

Examples of the carbodiimidization catalyst include phospholene oxides such as 1-phenyl-2-phospholene-1-oxide, 3-methyl-2-phospholene-1-oxide, 1-ethyl-3-methyl-2-phospholene-1-oxide, 1-ethyl-2-phospholene-1-oxide, and 3-phospholene isomers thereof.

——Isocyanate-Based Hydrolysis Inhibitors——

Examples of the isocyanate-based hydrolysis inhibitors include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylylene diisocyanate, tetramethylxylylene diisocyanate, hydrogenated xylylene diisocyanate, lysine diisocyanate, isophorone diisocyanate, 4,4'-dicyclohexylmethane diisocyanate, and 3,3'-dimethyl-4,4'-dicyclohexylmethane diisocyanate.

——Oxazoline-Based Hydrolysis Inhibitors——

Examples of the oxazoline-based hydrolysis inhibitors include 2,2'-o-phenylenebis(2-oxazoline), 2,2'-m-phenylenebis(2-oxazoline), 2,2'-p-phenylenebis(2-oxazoline), 2,2'-p-phenylenebis(4-methyl-2-oxazoline), 2,2'-m-phenylenebis(4-methyl-2-oxazoline), 2,2'-p-phenylenebis(4,4'-dimethyl-2-oxazoline), 2,2'-m-phenylenebis(4,4'-dimethyl-2-oxazoline), 2,2'-ethylenebis(2-oxazoline), 2,2'-tetramethylenebis(2-oxazoline), 2,2'-hexamethylenebis(2-oxazoline), 2,2'-octamethylenebis(2-oxazoline), 2,2'-ethylenebis(4-methyl-2-oxazoline), and 2,2'-diphenylenebis(2-oxazoline).

——Epoxy-Based Hydrolysis Inhibitors——

Examples of the epoxy-based hydrolytic agents include diglycidyl ethers of aliphatic olio's such as 1,6-hexanediol, neopentyl glycol, and polyalkylene glycols; polyglycidyl ethers of aliphatic polyols such as sorbitol, sorbitan, polyglycerol, pentaerythritol, diglycerol, glycerol, and trimethylolpropane; polyglycidyl ethers of alicyclic polyols such as cyclohexanedimethanol; diglycidyl esters or polyglycidyl esters of aliphatic or aromatic polyvalent carboxylic acids such as terephthalic acid, isophthalic acid, naphthalenedicarboxylic acid, trimellitic acid, adipic acid, and sebacic acid; diglycidyl ethers or polyglycidyl ethers of polyhydric phenols such as resorcinol, bis-(p-hydroxyphenyl)methane, 2,2-bis-(p-hydroxyphenyl)propane, tris-(p-hydroxyphenyl)methane, and 1,1,2,2-tetrakis(p-hydroxyphenyl)ethane; N-glycidyl derivatives of amines such as N,N-diglycidylaniline, N,N-diglycidyltoluidine, and N,N,N',N'-tetraglycidyl-bis-(p-aminophenyl)methane; triglycidyl derivatives of aminophenols; triglycidyl tris(2-hydroxyethyl)isocyanurate; triglycidyl isocyanurate; and epoxy resins such as orthocresol type epoxy resins and phenol novolac type epoxy resins.

The amount of the hydrolysis inhibitor added is not particularly limited but is preferably 0.1 parts by mass or more, more preferably 0.2 parts by mass or more, and particularly preferably 0.5 parts by mass or more and preferably 5 parts by mass or less, more preferably 4.5 parts by mass or less, and particularly preferably 3 parts by mass or less based on 100 parts by mass of the hydroxyl-terminated urethane prepolymer.

—Antioxidant—

As the antioxidant, those described above can be used, and the preferred examples and the amount added are also as described above.

—Ultraviolet Absorbing Agent—

Examples of the ultraviolet absorbing agent include benzophenone-based compounds, benzotriazole-based compounds, salicylic acid-based compounds, oxalic acid anilide-based compounds, cyanoacrylate-based compounds, and triazine-based compounds. One ultraviolet absorbing agent can be used alone, or two or more ultraviolet absorbing agents can be used in combination.

The amount of the ultraviolet absorbing agent added is not particularly limited but is preferably 0.01 parts by mass or more, more preferably 0.1 parts by mass or more, and particularly preferably 0.2 parts by mass or more and preferably 3 parts by mass or less, more preferably 2.5 parts by mass or less, and particularly preferably 2 parts by mass or less based on 100 parts by mass of the hydroxyl-terminated urethane prepolymer.

—Light Stabilizer—

Examples of the light stabilizer include hindered amine-based compounds and hindered piperidine-based compounds. One light stabilizer can be used alone, or two or more light stabilizers can be used in combination.

The amount of the light stabilizer added is not particularly limited but is preferably 0.01 parts by mass or more, more preferably 0.1 parts by mass or more, and particularly preferably 0.2 parts by mass or more and preferably 2 parts by mass or less, more preferably 1.5 parts by mass or less, and particularly preferably 1 part by mass or less based on 100 parts by mass of the hydroxyl-terminated urethane prepolymer.

—Antistatic Agent—

Examples of the antistatic agent include inorganic salts, polyhydric alcohol compounds, ionic liquids, and surfactants. One antistatic agent can be used alone, or two or more antistatic agents can be used in combination.

Among these, ionic liquids are preferred. The "ionic liquid" is also referred to as a room temperature molten salt and is a salt having fluidity at 25° C.

——Inorganic Salts——

Examples of the inorganic salts include sodium chloride, potassium chloride, lithium chloride, lithium perchlorate, ammonium chloride, potassium chlorate, aluminum chloride, copper chloride, ferrous chloride, ferric chloride, ammonium sulfate, potassium nitrate, sodium nitrate, sodium carbonate, and sodium thiocyanate.

——Polyhydric Alcohol Compounds——

Examples of the polyhydric alcohol compounds include propanediol, butanediol, hexanediol, polyethylene glycol, trimethylolpropane, and pentaerythritol.

——Ionic Liquids——

Examples of the ionic liquids include ionic liquids including imidazolium ions such as 1-ethyl-3-methylimidazolium bis(trifluoromethylsulfonyl)imide, 1,3-dimethylimidazolium bis(trifluoromethylsulfonyl)imide, and 1-butyl-3-methylimidazolium bis(trifluoromethylsulfonyl)imide; ionic liquids including pyridinium ions such as 1-methylpyridinium bis(trifluoromethylsulfonyl)imide, 1-butylpyridinium bis(trifluoromethylsulfonyl)imide, 1-hexylpyridinium bis(trifluoromethylsulfonyl)imide, 1-octylpyridinium bis(trifluoromethylsulfonyl)imide, 1-hexyl-4-methylpyridinium bis(trifluoromethylsulfonyl)imide, 1-hexyl-4-methylpyridinium hexafluorophosphate, 1-octyl-4-methylpyridinium bis(trifluoromethylsulfonyl)imide, 1-octyl-4-methylpyridinium bis(fluorosulfonyl)imide, 1-methylpyridinium bis(perfluoroethylsulfonyl)imide, and 1-methylpyridinium bis(perfluorobutylsulfonyl)imide; ionic liquids including ammonium ions such as trimethylheptylammonium bis(trifluoromethanesulfonyl)imide, N,N-diethyl-N-methyl-N-propylammonium bis(trifluoromethanesulfonyl)imide, N,N-diethyl-N-methyl-N-pentylammonium bis(trifluoromethanesulfonyl)imide, N,N-diethyl-N-methyl-N-heptylammonium bis(trifluoromethanesulfonyl)imide, and tri-n-butylmethylammonium bistrifluoromethanesulfonimide; and other ionic liquids such as pyrrolidinium salts, phosphonium salts, and sulfonium salts.

——Surfactants——

Examples of the surfactants include nonionic low molecular surfactants such as glycerin fatty acid esters, polyoxyalkylene alkyl ethers, polyoxyethylene alkyl phenyl ethers, polyoxyethylene alkylamines, polyoxyethylene alkylamine fatty acid esters, and fatty acid thethanolamides; anionic low molecular surfactants such as alkyl sulfonates, alkylbenzene sulfonates, and alkyl phosphates; cationic low molecular surfactants such as tetraalkylammonium salts and trialkylbenzylammonium salts; amphoteric low molecular surfactants such as alkyl betaines and alkylimidazolium betaines; nonionic polymeric surfactants such as a polyether ester amide type, an ethylene oxide-epichlorohydrin type, and a polyether ester type; anionic polymeric surfactants such as a polystyrene sulfonic acid type; cationic polymeric surfactants such as a quaternary ammonium base-containing acrylate polymer type; and amphoteric polymeric surfactants such as amino acid type amphoteric surfactants such as higher alkyl aminopropionates, and betaine type amphoteric surfactants such as higher alkyl dimethyl betaines and higher alkyl dihydroxyethyl betaines.

The amount of the antistatic agent added is not particularly limited but is preferably 0.01 parts by mass or more, more preferably 0.03 parts by mass or more, and particularly preferably 0.05 parts by mass or more and preferably 10 parts by mass or less, more preferably 5 parts by mass or less, and particularly preferably 3 parts by mass or less based on 100 parts by mass of the hydroxyl-terminated urethane prepolymer.

—Leveling Agent—

Examples of the leveling agent include acrylic leveling agents, fluorine-based leveling agents, and silicone-based leveling agents. One leveling agent can be used alone, or two or more leveling agents can be used in combination.

Among these, acrylic leveling agents are preferred.

The amount of the leveling agent added is not particularly limited but is preferably 0.001 parts by mass or more, more preferably 0.01 parts by mass or more, and particularly preferably 0.1 parts by mass or more and preferably 2 parts by mass or less, more preferably 1.5 parts by mass or less, and particularly preferably 1 part by mass or less based on 100 parts by mass of the hydroxyl-terminated urethane prepolymer.

—Other Optional Components—

Examples of other optional components include catalysts, other resins other than urethane prepolymers, fillers (talc, calcium carbonate, titanium oxide, and the like), metal powders, colorants (pigments and the like), foil-like materials, softening agents, conductive agents, silane coupling agents, lubricants, corrosion inhibitors, heat resistance stabilizers, weather resistance stabilizers, polymerization inhibitors, and antifoaming agents.

(Pressure-Sensitive Adhesive)

The pressure-sensitive adhesive of the present invention is obtained by curing the pressure-sensitive adhesive composition of the present invention.

The content proportion of oxyethylene groups to the total amount of oxyalkylene groups in the pressure-sensitive adhesive of the present invention is not particularly limited but is preferably 10% by mass or more, more preferably 12% by mass or more, further preferably 15% by mass or more, still further preferably 20% by mass or more, and particularly preferably 25% by mass or more and preferably 70% by mass or less, more preferably 60% by mass or less, further preferably 50% by mass or less, and still further preferably 40% by mass or less. When the content proportion of oxyethylene groups to the total amount of oxyalkylene groups in the pressure-sensitive adhesive of the present invention is equal to or more than the lower limit value, the tackiness to a high polarity base material improves more, and the moist heat resistance improves easily. When the content proportion of oxyethylene groups to the total amount of oxyalkylene groups in the pressure-sensitive adhesive of the present invention is equal to or less than the upper limit value, the haze is easily suppressed, and the transparency improves easily.

The content proportion of oxyethylene groups (ethylene oxide unit content) to the total amount of oxyalkylene groups in the pressure-sensitive adhesive is calculated by obtaining the monomer compositions of the oxyalkylene chains using $^{1}$H-NMR.

(Sticky Material)

The sticky material of the present invention includes a base material and a pressure-sensitive adhesive layer including the pressure-sensitive adhesive of the present invention provided on a surface of the base material.

In the form of the sticky material of the present invention, it is preferred that a pressure-sensitive adhesive layer is provided on one surface of a substrate, and the sticky material has a release liner or a support film peelably laminated covering the pressure-sensitive adhesive surface of the pressure-sensitive adhesive layer.

The sticky material of the present invention is produced, for example, by coating a support film with a pressure-sensitive adhesive aqueous solution (pressure-sensitive adhesive water dispersion) in which the pressure-sensitive adhesive of the present invention is dissolved (dispersed) in water, using a coating applicator, drying the coating pressure-sensitive adhesive aqueous solution (pressure-sensitive adhesive water dispersion) to form a pressure-sensitive adhesive layer, and laminating a substrate on the surface of the formed pressure-sensitive adhesive layer opposite to the support film, followed by aging.

Here, in the method for producing the sticky material, instead of forming a pressure-sensitive adhesive layer on a support film and laminating a substrate on the surface of the formed pressure-sensitive adhesive layer opposite to the support film, it is possible to form a pressure-sensitive adhesive layer on a substrate and laminate a support film on the surface of the formed pressure-sensitive adhesive layer opposite to the substrate.

The thickness of the substrate is not particularly limited but is preferably 5 μm or more, more preferably 10 μm or more, and particularly preferably 20 μm or more and preferably 200 μm or less, more preferably 100 μm or less, and particularly preferably 50 μm or less. When the thickness of the substrate is within the preferred range, the possibility that the sticky material breaks can be decreased. Examples of the material of the substrate include urethane-based polymers such as polyether urethanes and polyester urethanes; amide-based polymers such as polyether polyamide block polymers; acrylic polymers such as polyacrylates; olefin-based polymers such as polyethylene, polypropylene, and ethylene/vinyl acetate copolymers; and ester-based polymers such as polyether polyesters. As the material of the substrate, ester-based polymers are preferred.

One material of the substrate can be used alone, or two or more materials of the substrate can be used in combination. Further, the substrate may be a laminated film in which substrates produced from different materials are laminated. The substrate can be laminated with a fabric such as a woven fabric, a nonwoven fabric, a knitted fabric, or a net.

The thickness of the pressure-sensitive adhesive layer is not particularly limited but is preferably 5 μm or more, more preferably 10 μm or more, and particularly preferably 20 μm or more and preferably 100 μm or less, more preferably 50 μm or less, and particularly preferably 30 μm or less. When the thickness of the pressure-sensitive adhesive layer is within this range, better tackiness is obtained.

In the sticky material of the present invention, in order to prevent the contamination of the surface of the pressure-sensitive adhesive layer, the pressure-sensitive adhesive layer surface is preferably covered with a release liner or a support film until use.

As the release liner, specifically, one in which the surface of high quality paper, glassine paper, parchment paper, or the like is coated with a release agent having release performance such as a silicone resin or a fluororesin; or one in which the surface of high quality paper anchor-coated with a resin, polyethylene-laminated high quality paper, or the like is coated with a release agent having release performance such as a silicone resin or a fluororesin can be used.

The material of the support film is not particularly limited, but a plastic film such as a polyester film is preferred. The support film can be peelably laminated on the surface of the substrate opposite to the surface on which the pressure-sensitive adhesive layer is formed. In order to peelably bond the support film to the back surface of the substrate, a method such as inflation molding, extrusion laminate molding, laminate molding, or casting can be used. The thickness of the support film differs depending on the material and is preferably 15 μm or more, more preferably 20 μm or more, and particularly preferably 30 μm or more and preferably 200 μm or less, more preferably 100 μm or less, and particularly preferably 50 μm or less.

(Pressure-Sensitive Adhesive Tape)

The pressure-sensitive adhesive tape of the present invention includes a base material and a pressure-sensitive adhesive layer including the pressure-sensitive adhesive of the present invention provided on at least one surface of the base material.

In the pressure-sensitive adhesive tape of the present invention, the pressure-sensitive adhesive layer may be provided only on one of the surfaces of the base material or may be provided on both of the surfaces of the base material.

In one form of the pressure-sensitive adhesive tape of the present invention, it is preferred that a pressure-sensitive adhesive layer is provided on one surface of a substrate, and the pressure-sensitive adhesive tape has a release liner or a support film peelably laminated covering the pressure-sensitive adhesive surface of the pressure-sensitive adhesive layer. This form is particularly referred to as a single-sided pressure-sensitive adhesive tape.

The substrate, the release liner, and the support film are the same as those of the sticky material of the present invention. The thickness of the pressure-sensitive adhesive layer is the same as the thickness of the pressure-sensitive adhesive layer in the sticky material of the present invention.

The pressure-sensitive adhesive tape of the present invention can be produced in the same manner as the sticky material of the present invention.

In another form of the pressure-sensitive adhesive tape of the present invention, it is preferred that pressure-sensitive adhesive layers are provided on both surfaces of a substrate, and the pressure-sensitive adhesive tape has release liners or support films peelably laminated covering the pressure-sensitive adhesive surfaces of the pressure-sensitive adhesive layers. This form is particularly referred to as a double-sided pressure-sensitive adhesive tape.

The substrate, the release liners, and the support films are the same as those of the sticky material of the present invention. The thickness of the pressure-sensitive adhesive layer is the same as the thickness of the pressure-sensitive adhesive layer in the sticky material of the present invention.

In still another form of the pressure-sensitive adhesive tape of the present invention, it is preferred that a pressure-sensitive adhesive layer is provided on one surface of a peelable substrate, and the pressure-sensitive adhesive tape has a release liner or a support film peelably laminated covering the pressure-sensitive adhesive surface of the pressure-sensitive adhesive layer. This form is particularly referred to as a pressure-sensitive adhesive transfer tape.

For the peelable substrate, one in which the surface of a substrate that can be used in the sticky material of the present invention is coated with a release agent having release performance such as a silicone resin or a fluororesin is preferred. The release liner and the support film are the same as those of the sticky material of the present invention. The thickness of the pressure-sensitive adhesive layer is the same as the thickness of the pressure-sensitive adhesive layer in the sticky material of the present invention.

EXAMPLES

The present invention will be described in detail below by giving Examples. However, the present invention is not limited by the following Examples.

Synthesis Examples 1 to 5, 7 to 13, 15, and 16 are Practical Synthesis Examples, and Synthesis Examples 6 and 14 are Comparative Synthesis Examples.

Production Examples 1 to 9 and 15 to 22 are Practical Production Examples, and Production Examples 10 and 12 to 14 are Comparative Production Examples.

Examples 1 to 9 and 13 to 20 are Examples, and Examples 10 to 12 are Comparative Examples.

<Methods for Measuring Physical Properties>

[Hydroxyl Number]

The hydroxyl number of an oxyalkylene polymer A was calculated according to the titration method of JIS K 1557-1B: 2007.

[Molecular Weights Mn and Mw and Mw/Mn]

The number average molecular weight Mn and molecular weight distribution Mw/Mn of an oxyalkylene polymer are values obtained by measurement by the method described below.

For several types of monodisperse polystyrene having different degrees of polymerization as standard samples for molecular weight measurement, measurement was performed using a commercial GPC measuring apparatus (HLC-8320GPC, manufactured by Tosoh Corporation), and a calibration curve was prepared based on the relationship between the molecular weight and retention time of the polystyrene. An oxyalkylene polymer, which was a measurement sample, was diluted to 0.5% by mass with tetrahydrofuran and passed through a 0.5 μm filter, and then for the measurement sample, measurement was performed using the GPC measuring apparatus. The GPC spectrum of the measurement sample was computer-analyzed using the calibration curve to obtain the Mn and weight average molecular weight (hereinafter referred to as Mw) of the measurement sample.

The molecular weight distribution is the value calculated from the Mw and Mn and is the ratio of Mw to Mn (hereinafter sometimes referred to as "Mw/Mn").

Further, the Mw of a hydroxyl-terminated urethane prepolymer was measured by GPC in the same manner as above.

[Degree of Unsaturation]

The degree of unsaturation of an oxyalkylene polymer is a value measured according to the method of JIS-K1557-6.

[Content Proportion of Oxyethylene Groups (Ethylene Oxide Unit (EO Unit) Content)]

The content proportion of oxyethylene groups (ethylene oxide unit content) to the total amount of oxyalkylene groups for an oxyalkylene polymer, a urethane prepolymer, and a pressure-sensitive adhesive is calculated by obtaining the monomer composition(s) of the oxyalkylene chain(s) using 1H-NMR.

For example, when the oxyalkylene polymer is a polyol including a propylene oxide unit and an ethylene oxide unit, the ethylene oxide unit content can be obtained from the area ratio between the signal of the methyl group in the propylene oxide unit and the signals of the methylene groups in the propylene oxide unit and in the ethylene oxide unit.

Synthesis of Oxyalkylene Polymers

Synthesis Example 1: Synthesis of Polymer A1

(Step a)

As the initiator, a polyol (initiator A) obtained by addition-reacting propylene oxide with glycerin with a KOH catalyst to a molecular weight of 3,000 was used.

First, 1243 g of the initiator A and a hexacyanocobaltate complex (hereinafter also referred to as a TBA-DMC catalyst) slurry in which the ligand was t-butanol were added into a pressure-resistant reaction container to form a reaction liquid. The amount of the TBA-DMC catalyst slurry was such an amount that the concentration of the metal of the TBA-DMC catalyst in the reaction liquid was 50 ppm.

Then, the pressure-resistant reaction container was purged with nitrogen, and then the reaction liquid was heated while being stirred. When the temperature reached 140° C., the heating was stopped, and while the stirring was continued, 124 g (10.0 parts by mass based on 100 parts by mass of the initiator) of propylene oxide was supplied into the pressure-resistant reaction container and reacted.

(Step b)

After the temperature increase of the reaction liquid stopped, the reaction liquid was cooled to 140° C., and while the reaction liquid was stirred, a mixture of 1386 g of propylene oxide and 1386 g of ethylene oxide was supplied into the pressure-resistant reaction container. After it was confirmed that the change in internal pressure disappeared, and the reaction was completed, the catalyst was neutralized and removed using a synthetic adsorbent (KYOWAAD 600S, manufactured by Kyowa Chemical Industry Co., Ltd.) to obtain a polymer A1.

The number of hydroxyl groups, hydroxyl number, Mn, Mw/Mn, degree of unsaturation, and content of oxyethylene units (hereinafter referred to as "EO units") of the polymer A1 thus obtained are shown in Table 1-1. The values of these are values measured by the above-described methods. Also for the polymers A2 to A8 and B1 to B8 obtained in the following Synthesis Examples 2 to 14, the number of hydroxyl groups, the hydroxyl number, the Mn, the Mw/Mn, the degree of unsaturation, and the content of oxyethylene units are shown in Table 1-1 and Table 1-2 in the same manner.

The numbers of hydroxyl groups (3 or 2) of the initiators (glycerin or propylene glycol) used in the synthesis of the oxyalkylene polymers A and B are described for "Number of hydroxyl groups" in Table 1-1 and Table 1-2, and these numerical values are the average numbers of hydroxyl groups of the oxyalkylene polymers A and B as they are.

Synthesis Example 2: Synthesis of Polymer A2

The polymer A2 was synthesized in the same manner as in Synthesis Example 1 except that the mass of the initiator A in (Step a) was changed to 1232 g, and the mass of propylene oxide and the mass of ethylene oxide in (Step b) were changed to 2043 g and 703 g.

Synthesis Example 3: Synthesis of Polymer A3

The polymer A3 was synthesized in the same manner as in Synthesis Example 1 except that the mass of the initiator A in (Step a) was changed to 1970 g, and the mass of propylene oxide and the mass of ethylene oxide in (Step b) were changed to 2924 g and 2091 g.

Synthesis Example 4: Synthesis of Polymer A4

The polymer A4 was synthesized in the same manner as in Synthesis Example 1 except that the initiator A in (Step a) was changed to a polyol (initiator B) obtained by addition-reacting ethylene oxide with glycerin until the content of EO units reached 80% by mass, the mass of the initiator B was 2100 g, and the mass of propylene oxide and the mass of ethylene oxide in (Step b) were changed to 759 g and 3036 g.

Synthesis Example 5: Synthesis of Polymer A5

As the initiator, a polyol (initiator C) obtained by addition-reacting propylene oxide with glycerin with a KOH catalyst to a molecular weight of 1,300 was used.

1106 g of the initiator C, 12.6 g of a KOH catalyst, 1494 g of propylene oxide, and 1400 g of ethylene oxide were added into a pressure-resistant reaction container and stirred at 110° C. for 1.5 h for ring-opening addition polymerization, and then the catalyst was neutralized and removed using a synthetic adsorbent (KYOWAAD 600S, manufactured by Kyowa Chemical Industry Co., Ltd.) to obtain the polymer A5.

Synthesis Example 6: Synthesis of Polymer A6

As the initiator, glycerin was used.

119 g of glycerin, 25.3 g of a KOH catalyst, 1576 g of propylene oxide, and 6305 g of ethylene oxide were added into a pressure-resistant reaction container and stirred at 110° C. for 1.5 h for ring-opening addition polymerization, and then the catalyst was neutralized and removed using a synthetic adsorbent (KYOWAAD 600S, manufactured by Kyowa Chemical Industry Co., Ltd.) to obtain the polymer A6.

Synthesis Example 7: Synthesis of Polymer A7

The polymer A7 was synthesized in the same manner as in Synthesis Example 1 except that the mass of the initiator A in (Step a) was changed to 743 g, and the mass of propylene oxide and the mass of ethylene oxide in (Step b) were changed to 2291 g and 966 g.

Synthesis Example 8: Synthesis of Polymer A8

(Step a)

As the initiator, a polyol (initiator D) obtained by addition-reacting propylene oxide with glycerin with a KOH catalyst to a molecular weight of 1,500 was used.

First, 1.4 g of a zinc hexacyanocobaltate-glyme complex, which was a DMC catalyst, and 1050 g of the initiator D were added into a pressure-resistant reactor to form a reaction liquid. The pressure-resistant reaction container was purged with nitrogen, and then the reaction liquid was heated to 140° C. while being stirred. Then, the heating was stopped, and 105 g (10.0 parts by mass based on 100 parts by mass of the initiator) of propylene oxide was supplied into the pressure-resistant reaction container and reacted with the initiator D.

(Step b)

After the temperature increase of the reaction liquid stopped, a nitrogen atmosphere at 130° C. was provided in the pressure-resistant reaction container, 5110 g of propylene oxide was reacted for 5 h, and the catalyst was deactivated. Subsequently, 22.1 g of a KOH catalyst was added, and the reaction liquid was subjected to dehydration treatment at 120° C. for 2 h. After alcoholate formation, 840 g of ethylene oxide was reacted, and then the catalyst was neutralized and removed using a synthetic adsorbent (KYOWAAD 600S, manufactured by Kyowa Chemical Industry Co., Ltd.) to obtain the polymer A8 in which ethylene oxide was added at an end.

Synthesis Example 9: Synthesis of Polymer B1

The polymer B1 was synthesized in the same manner as in Synthesis Example 1 except that the initiator A in (Step a) was changed to a polyol (initiator E) obtained by addition-reacting propylene oxide with propylene glycol to a molecular weight of 2,000, the mass of the initiator E was 865 g, and the mass of propylene oxide and the mass of ethylene oxide in (Step b) were changed to 1689 g and 1689 g.

Synthesis Example 10: Synthesis of Polymer B2

The polymer B2 was synthesized in the same manner as in Synthesis Example 9 except that the mass of the initiator E in (Step a) was changed to 800 g, and the mass of propylene oxide and the mass of ethylene oxide in (Step b) were changed to 2494 g and 800 g.

Synthesis Example 11: Synthesis of Polymer B3

The polymer B3 was synthesized in the same manner as in Synthesis Example 9 except that the mass of the initiator E in (Step a) was changed to 1310 g, and the mass of propylene oxide and the mass of ethylene oxide in (Step b) were changed to 3684 g and 2079 g.

Synthesis Example 12: Synthesis of Polymer B4

As the initiator, dipropylene glycol was used. 134 g of dipropylene glycol, 12.6 g of a KOH catalyst, 660 g of propylene oxide, and 3200 g of ethylene oxide were added into a pressure-resistant reaction container and stirred at 110° C. for 1.5 h for ring-opening addition polymerization, and then the catalyst was neutralized and removed using a synthetic adsorbent (KYOWAAD 600S, manufactured by Kyowa Chemical Industry Co., Ltd.) to obtain the polymer B4.

Synthesis Example 13: Synthesis of Polymer B5

As the initiator, a polyol (initiator F) obtained by addition-reacting propylene oxide with propylene glycol with a KOH catalyst to a molecular weight of 400 was used. 1200 g of the initiator F and 18.9 g of a KOH catalyst were added into a pressure-resistant reaction container and subjected to dehydration treatment at 120° C. for 2 h. After alcoholate formation, 2100 g of propylene oxide was reacted, then 2516 g of ethylene oxide was reacted, and then the catalyst was neutralized and removed using a synthetic adsorbent (KYOWAAD 600S, manufactured by Kyowa Chemical Industry Co., Ltd.) to obtain the polymer B5 in which ethylene oxide was added at an end.

Synthesis Example 14: Synthesis of Polymer B6

The polymer B6 was synthesized in the same manner as in Synthesis Example 8 except that the initiator D in (Step a) of Synthesis Example 8 was changed to 350 g of a polyol (initiator G) obtained by addition-reacting propylene oxide with propylene glycol to a molecular weight of 700, the mass of the zinc hexacyanocobaltate-glyme complex was changed to 0.37 g, the mass of the KOH catalyst was changed to 6.3 g, and the mass of propylene oxide and the mass of ethylene oxide in (Step b) were changed to 1490 g and 160 g.

Synthesis Example 15: Synthesis of Polymer B7

The polymer B7 was synthesized in the same manner as in Synthesis Example 9 except that the mass of the initiator E in (Step a) was changed to 2800 g, and the mass of propylene oxide and the mass of ethylene oxide in (Step b) were changed to 210 g and 3990 g.

Synthesis Example 16: Synthesis of Polymer B8

The polymer B8 was synthesized in the same manner as in Synthesis Example 14 except that the mass of the initiator G and the mass of the zinc hexacyanocobaltate-glyme complex in (Step a) of Synthesis Example 14 were changed to 461 g and 0.40 g, and the mass of propylene oxide, the mass of the KOH catalyst, and the mass of ethylene oxide in (Step b) were changed to 1539 g, 8.3 g, and 632 g.

Production Example 1

[Production of Hydroxyl-Terminated Urethane Prepolymer]

20 Parts by mass of the polymer A1, 20 parts by mass of the polymer A2, 30 parts by mass of the polymer B1, and 30 parts by mass of the polymer B2 as shown in Table 2-1 were added to a reaction container equipped with a thermometer, a stirrer, and a cooling tube. Then, 0.01 parts by mass of a urethane formation catalyst (dibutyltin dilaurate, manufactured by TOKYO CHEMICAL INDUSTRY CO., LTD.) and 1 part by mass of Irganox 1135 (manufactured by BASF) as an antioxidant were added, and mixed at 40° C., and then 1.05 parts by mass of hexamethylene diisocyanate (DURANATE 50M, manufactured by Asahi Kasei Corporation, described as "HDI" in Table 2-1) as a diisocyanate compound was added and reacted at 70° C. The isocyanate index was 50. Heat generation occurred due to the reaction, the internal temperature reached about 70° C., and the viscosity also increased with time. The reaction liquid was stirred at 70° C. for 3 h, and after the disappearance of the isocyanate groups was confirmed by FT-IR, the reaction liquid was cooled to room temperature. After the cooling, the reaction liquid was stirred for 3 h while 335 parts by mass of water was added for dilution, to obtain as a uniform transparent solution a hydroxyl-terminated urethane prepolymer-containing water dispersion (also referred to as a "urethane prepolymer U1") in which the average number of hydroxyl groups was 2.4, and the solid content was 23% by mass. The content of EO units (% by mass), the average number of hydroxyl groups, the Mw, the water solubility, and the solid content (% by mass) of the obtained water dispersion for the obtained urethane prepolymer U1 are shown in Table 2-1. Also for the following Production Examples, the content of EO units (% by mass), the average number of hydroxyl groups, the Mw, the water solubility, and the solid content (% by mass) of the obtained water dispersion are shown in Table 2-1 in the same manner.

In Table 2-1 and Table 2-2, "index" is a value (isocyanate index) obtained by centupling the ratio of the number of moles of the isocyanate groups of a diisocyanate compound to the total number of moles of the hydroxyl groups of oxyalkylene polymers used when a hydroxyl-terminated urethane prepolymer is produced, "Content of EO units" is the content proportion of oxyethylene groups (ethylene oxide unit content) (unit: % by mass) to the total amount of oxyalkylene groups in a hydroxyl-terminated urethane prepolymer, "Average number of hydroxyl groups" is the average of the number of hydroxyl groups in one molecule of a hydroxyl-terminated urethane prepolymer calculated by the following calculation method, and "Water solubility" is the water solubility of a hydroxyl-terminated urethane prepolymer (solids) evaluated by the following evaluation method. In Table 2-1 and Table 2-2, "-" indicates that the component is not blended.

[Calculation of Average Number of Hydroxyl Groups of Urethane Prepolymer]

"The average number of hydroxyl groups, f," of a urethane prepolymer was calculated by the following formula (I):

$$f = (\text{the average number of hydroxyl groups of an oxyalkylene polymer } A) \times (\text{the mass of the oxyalkylene polymer } A \text{ to the total mass of the oxyalkylene polymer } A \text{ and an oxyalkylene polymer } B) + (\text{the average number of hydroxyl groups of the oxyalkylene polymer } B) \times (\text{the mass of the oxyalkylene polymer } B \text{ to the total mass of the oxyalkylene polymer } A \text{ and the oxyalkylene polymer } B) \quad \text{(I)}$$

[Evaluation of Water Solubility of Urethane Prepolymer]

The water solubility of the urethane prepolymer (solids) obtained in Production Example 1 was evaluated.

The water solubility of the urethane prepolymer (solids) was evaluated according to the following criteria:

A . . . The urethane prepolymer dissolves in water at 25° C. and becomes transparent.

D . . . The urethane prepolymer does not dissolve in water at 25° C., and haze, white turbidity, or an undissolved residue occurs.

Production Examples 2 to 10 and 12 to 22

Hydroxyl-terminated urethane prepolymers (also referred to as "urethane prepolymers U2 to 10 and 12 to 22") were produced by the same procedure as in Production Example 1 except that the amounts blended (parts by mass) were changed to the amounts blended (parts by mass) shown in Table 2-1 and Table 2-2. The index, the content of EO units (% by mass), the average number of hydroxyl groups, the Mw, the water solubility, and the solid content (% by mass) of the obtained water dispersion for the produced urethane prepolymers U2 to 10 and 12 to 22 were measured, calculated, or evaluated in the same manner as in Production Example 1. The obtained results are shown in Table 2-1 and Table 2-2.

In Table 2-1 and Table 2-2, "IPDI" represents "isophorone diisocyanate (manufactured by TOKYO CHEMICAL INDUSTRY CO., LTD.)", "D101" represents "a bifunctional isocyanate group-terminated urethane prepolymer (manufactured by Asahi Kasei Corporation, DURANATE D101)", "Irganox 565" represents "2,6-di-t-butyl-4-(4,6-bis (octylthio)-1,3,5-triazin-2-ylamino)phenol (manufactured by BASF, Irganox 565)", "BHT" represents "2,6-di-tt-butyl-4-methylphenol", and "CBP-E" represents "an emulsified liquid of 2,2'-dihydroxy-3,3'-di(α-methylcyclohexyl)-5,5'-dimethyldiphenylmethane (manufactured by Seiko Chemical Co., Ltd., NONFLEX CBP-E)".

Example 1

[Production of Pressure-Sensitive Adhesive]

100 Parts by mass of the urethane prepolymer U1, 4.93 parts by mass of a curing agent (water-dispersible isocyanate, WR80-70P, manufactured by Asahi Kasei Corporation), and 0.005 parts by mass of a curing catalyst (Borchi Kat 24, manufactured by Borchers) as shown in Table 3 were uniformly mixed to obtain a pressure-sensitive adhesive composition. Then, the obtained pressure-sensitive adhesive composition was defoamed, applied to a polyester film (support film, thickness 38 μm) subjected to release treatment, using a knife coater, so as to obtain a dry film thickness of 25 μm, and then cured and dried at 100° C. for 3 min to form a pressure-sensitive adhesive layer.

A polyester film (substrate) having a thickness of 38 μm was bonded to the obtained pressure-sensitive adhesive layer and then stored in a hot air dryer under an atmosphere of 50° C. for 3 days to complete the crosslinking reaction of the pressure-sensitive adhesive layer to make a sticky material (pressure-sensitive adhesive tape) including a pressure-sensitive adhesive layer including a pressure-sensitive adhesive. The coating properties of the pressure-sensitive adhesive composition on the support film were evaluated as follows. For the pressure-sensitive adhesive in the pressure-sensitive adhesive layer of the obtained sticky material (pressure-sensitive adhesive tape), the content of EO units (% by mass), the tack to glass, and the appearance (haze) were measured or evaluated by the following methods.

The content proportion of oxyethylene groups (ethylene oxide unit content) to the total amount of oxyalkylene groups per solids in the obtained pressure-sensitive adhesive was 26% by mass. The measurement results and evaluation results of the content proportion of oxyethylene groups (the content of EO units) (% by mass) to the total amount of oxyalkylene groups per solids in the obtained pressure-sensitive adhesive, the coating properties of the obtained pressure-sensitive adhesive composition, the tack of the obtained pressure-sensitive adhesive to glass, and the appearance (haze) of the obtained pressure-sensitive adhesive are shown in Table 3.

In Table 3, "AQ-140" represents "a water-dispersible isocyanate (manufactured by Tosoh Corporation, Aquanate 140)".

[Coating Properties]

The coating properties when the obtained pressure-sensitive adhesive composition was defoamed and then applied to a support film using a knife coater as described above were evaluated according to the following criteria:

A . . . There is no cissing, and a clean coating film is obtained.

D . . . Cissing occurs, and a clean coating film is not obtained.

[Tack to Glass]

The sticky material (pressure-sensitive adhesive tape) was cut to a width of 25 mm to form a test piece. The pressure-sensitive adhesive layer obtained by peeling the support film from this test piece was stuck to float glass under a 25° C. atmosphere.

Then, according to the test method described in "10 Tack" of JIS Z 0237: 2009, Testing methods of pressure-sensitive adhesive tapes and sheets, a 2 kg rubber roll was reciprocated once at a rate of 300 mm/min to pressure-bond the pressure-sensitive adhesive layer of the test piece to the float glass, and after standing for 20 min, for the pressure-bonded test piece, the peel force was measured at a peel angle of 180° and a peel rate of 300 mm/min.

The tack to glass was evaluated according to the following evaluation criteria. The evaluation results of the measured tack to glass are shown in the "Tack to glass" column of Table 3.

A . . . 0.01 N/25 mm or more and less than 0.1 N/25 mm

D . . . 0.1 N/25 mm or more or less than 0.01 N/25 mm

[Appearance (Haze) of Pressure-Sensitive Adhesive]

The haze of the pressure-sensitive adhesive in the pressure-sensitive adhesive layer obtained by peeling the support film from the obtained sticky material (pressure-sensitive adhesive tape) was measured using a color-turbidity simultaneous measuring instrument (manufactured by Nippon Denshoku Industries Co., Ltd., COH400). The haze was evaluated according to the following evaluation criteria. A haze value of less than 10% indicates good transparency. The evaluation results of the measured haze are shown in the "Haze" column of Table 3.

A . . . less than 10%

D . . . 10% or more

Example 2 to Example 20

Sticky materials (pressure-sensitive adhesive tapes) were produced in the same manner as in Example 1 with the amounts blended (parts by mass) as shown in Table 3. For the pressure-sensitive adhesives in the pressure-sensitive adhesive layers of the obtained sticky materials (pressure-sensitive adhesive tapes), the content proportion of oxyethylene groups (ethylene oxide unit content) (% by mass) to the total amount of oxyalkylene groups in the obtained pressure-sensitive adhesive, the coating properties of the pressure-sensitive adhesive composition, the tack of the obtained pressure-sensitive adhesive to glass, and the haze of the obtained pressure-sensitive adhesive were measured or evaluated in the same manner as in Example 1. The obtained results are shown in Table 3. In Table 3, "-" indicates that the component is not blended.

TABLE 1-1

| | Synthesis Examples | | | | | | | |
|---|---|---|---|---|---|---|---|---|
| | A1 | A2 | A3 | A4 | A5 | A6 | A7 | A8 |
| Number of hydroxyl groups | 3 | 3 | 3 | 3 | 3 | 3 | 3 | 3 |
| Hydroxyl number (mgKOH/g) | 17.2 | 17.4 | 16.7 | 16.4 | 36.1 | 27.9 | 10.7 | 17 |
| Mn | 11300 | 12100 | 12400 | 12800 | 5900 | 8200 | 17800 | 10200 |
| Mw/Mn | 1.33 | 1.16 | 1.17 | 1.14 | 1.12 | 1.09 | 1.24 | 1.46 |
| Degree of unsaturation | 0.012 | 0.013 | 0.004 | — | — | — | 0.005 | 0.025 |
| Content of EO units (% by mass) | 38 | 22 | 30 | 77 | 37 | 80 | 25 | 13 |

TABLE 1-2

| | Synthesis Examples | | | | | | | |
|---|---|---|---|---|---|---|---|---|
| | B1 | B2 | B3 | B4 | B5 | B6 | B7 | B8 |
| Number of hydroxyl groups | 2 | 2 | 2 | 2 | 2 | 2 | 2 | 2 |
| Hydroxyl number (mgKOH/g) | 11.6 | 12.1 | 11.4 | 29.3 | 55.9 | 27.5 | 23.1 | 28.9 |
| Mn | 13000 | 11800 | 13100 | 5000 | 2500 | 5500 | 6400 | 5300 |
| Mw/Mn | 1.15 | 1.27 | 1.13 | 1.14 | 1.10 | 1.19 | 1.12 | 1.15 |
| Degree of unsaturation | 0.009 | 0.010 | 0.004 | — | 0.008 | — | — | — |
| Content of EO units (% by mass) | 40 | 21 | 30 | 79 | 46 | 9 | 57 | 23 |

TABLE 2-1

| | | Production Examples | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 12 | 13 | 14 |
| Oxyalkylene polymers [parts by mass] | A1 | 20 | — | — | — | 30 | — | — | 40 | 40 | — | — | — | — |
| | A2 | 20 | — | 40 | — | — | — | — | — | — | — | — | — | — |
| | A3 | — | 40 | — | — | — | — | — | — | — | — | — | — | — |
| | A4 | — | — | — | — | — | — | 30 | — | — | — | — | 30 | — |
| | A5 | — | — | — | — | — | 45 | — | — | — | — | — | — | — |
| | A6 | — | — | — | — | — | — | — | — | — | — | — | — | 30 |
| | A7 | — | — | — | 30 | — | — | — | — | — | — | — | — | — |
| | A8 | — | — | — | — | — | — | — | — | — | 45 | 30 | — | — |
| | B1 | 30 | — | 60 | 70 | 70 | — | 70 | 60 | 60 | — | — | — | — |
| | B2 | 30 | — | — | — | — | — | — | — | — | — | — | — | — |
| | B3 | — | 60 | — | — | — | — | — | — | — | — | — | — | — |
| | R4 | — | — | — | — | — | — | — | — | — | 55 | — | 70 | 70 |
| | B5 | — | — | — | — | — | 55 | — | — | — | — | — | — | — |
| | B6 | — | — | — | — | — | — | — | — | — | — | 70 | — | — |
| | B7 | — | — | — | — | — | — | — | — | — | — | — | — | — |
| | B8 | — | — | — | — | — | — | — | — | — | — | — | — | — |
| Urethane formation catalyst [parts by mass] | | 0.01 | 0.005 | 0.01 | 0.01 | 0.01 | 0.005 | 0.01 | 0.01 | 0.01 | 0.01 | 0.005 | 0.01 | 0.01 |
| Antioxidants [parts by mass] | Irganox 1135 | 1 | 1 | 1 | 1 | 1 | 1 | 1 | 1 | 1 | 1 | 1 | 1 | 1 |
| | Irganox 565 | — | — | — | — | — | — | — | — | — | — | — | — | — |
| | BHT | — | — | — | — | — | — | — | — | — | — | — | — | — |
| | CBP-E | — | — | — | — | — | — | — | — | — | — | — | — | — |
| Diisocyanate compounds [parts by mass] | HDI | 1.05 | 1.21 | 1.26 | 1.03 | 1.15 | 4.23 | 1.34 | — | — | 2.2 | 2.2 | 2.95 | 3.15 |
| | IPDI | — | — | — | — | — | — | — | 1.37 | — | — | — | — | — |
| | D101 | — | — | — | — | — | — | — | — | 2.62 | — | — | — | — |
| Isocyanate index | | 50 | 60 | 60 | 60 | 70 | 60 | 70 | 50 | 50 | 60 | 60 | 80 | 75 |
| Content of EO units (% by mass) | | 30 | 30 | 33 | 36 | 39 | 42 | 51 | 39 | 39 | 49 | 10 | 78 | 79 |
| Average number of hydroxyl groups | | 2.40 | 2.45 | 2.40 | 2.30 | 2.30 | 2.45 | 2.30 | 2.40 | 2.40 | 2.45 | 2.30 | 2.30 | 2.30 |
| Weight average molecular weight Mw | | 63,400 | 124,300 | 87,900 | 60,800 | 216,800 | 22,700 | 82,900 | 60,000 | 90,200 | 54,900 | 42,900 | 93,500 | 48,700 |
| Water solubility | | A | A | A | A | A | A | A | A | A | D | D | A | A |
| Solids (% by mass) | | 23 | 22 | 22 | 26 | 21 | 51 | 21 | 31 | 29 | — | — | 21 | 19 |

TABLE 2-2

| | | Production Examples | | | | | | | |
|---|---|---|---|---|---|---|---|---|---|
| | | 15 | 16 | 17 | 18 | 19 | 20 | 21 | 22 |
| Oxyalkylene polymers [parts by mass] | A1 | — | — | — | — | — | — | — | — |
| | A2 | — | — | — | — | — | — | — | — |
| | A3 | — | — | 37.5 | 60 | — | — | — | — |
| | A4 | — | — | — | — | — | — | — | — |
| | A5 | 55 | 39 | — | — | 24 | 24 | 24 | 24 |
| | A6 | — | — | — | — | — | — | — | — |
| | A7 | — | — | — | — | — | — | — | — |
| | A8 | — | — | — | — | — | — | — | — |
| | B1 | — | — | — | — | 76 | 76 | 76 | 76 |

TABLE 2-2-continued

| | | Production Examples | | | | | | | |
|---|---|---|---|---|---|---|---|---|---|
| | | 15 | 16 | 17 | 18 | 19 | 20 | 21 | 22 |
| | B2 | — | — | — | — | — | — | — | — |
| | B3 | — | — | — | — | — | — | — | — |
| | B4 | — | — | — | 40 | — | — | — | — |
| | B5 | 45 | — | — | — | — | — | — | — |
| | B6 | — | — | — | — | — | — | — | — |
| | B7 | — | 61 | — | — | — | — | — | — |
| | B8 | — | — | 62.5 | — | — | — | — | — |
| Urethane formation catalyst [parts by mass] | | 0.005 | 0.005 | 0.005 | 0.005 | 0.005 | 0.005 | 0.005 | 0.005 |
| Antioxidants [parts by mass] | Irganox 1135 | 1 | 1 | 1 | 1 | 1 | — | — | — |
| | Irganox 565 | — | — | — | — | — | 1 | — | — |
| | BHT | — | — | — | — | — | — | 1 | — |
| | CBP-E | — | — | — | — | — | — | — | 1 |
| Diisocyanate compounds [parts by mass] | HDI | 4.05 | 1.87 | 1.44 | 2.44 | 1.17 | 1.17 | 1.17 | 1.17 |
| | IPDI | — | — | — | — | — | — | — | — |
| | D101 | — | — | — | — | — | — | — | — |
| Isocyanate index | | 60 | 44 | 45 | 75 | 45 | 45 | 45 | 45 |
| Content of EO units (% by mass) | | 41 | 49 | 26 | 50 | 39 | 39 | 39 | 39 |
| Average number of hydroxyl groups | | 2.55 | 2.39 | 2.38 | 2.60 | 2.24 | 2.24 | 2.24 | 2.24 |
| Weight average molecular weight Mw | | 28,800 | 25,100 | 29,900 | 32,200 | 43,200 | 43,200 | 43,200 | 43,200 |
| Water solubility | | A | A | A | A | A | A | A | A |
| Solids (% by mass) | | 52 | 35 | 32 | 35 | 35 | 35 | 35 | 35 |

TABLE 3

| | | Examples | | | | | | | | | | | | | | | | | | | |
|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 |
| Urethane prepolymers [parts by mass] | U1 | 100 | — | — | — | — | — | — | — | — | — | — | — | — | — | — | — | — | — | — | — |
| | U2 | — | 100 | — | — | — | — | — | — | — | — | — | — | — | — | — | — | — | — | — | — |
| | U3 | — | — | 100 | — | — | — | — | — | — | — | — | — | — | — | — | — | — | — | — | — |
| | U4 | — | — | — | 100 | — | — | — | — | — | — | — | — | — | — | — | — | — | — | — | — |
| | U5 | — | — | — | — | 100 | — | — | — | — | — | — | — | — | — | — | — | — | — | — | — |
| | U6 | — | — | — | — | — | 100 | — | — | — | — | — | — | — | — | — | — | — | — | — | — |
| | U7 | — | — | — | — | — | — | 100 | — | — | — | — | — | — | — | — | — | — | — | — | — |
| | U8 | — | — | — | — | — | — | — | 100 | — | — | — | — | — | — | — | — | — | — | — | — |
| | U9 | — | — | — | — | — | — | — | — | 100 | — | — | — | — | — | — | — | — | — | — | — |
| | U12 | — | — | — | — | — | — | — | — | — | 100 | — | — | — | — | — | — | — | — | — | — |
| | U13 | — | — | — | — | — | — | — | — | — | — | 100 | — | — | — | — | — | — | — | — | — |
| | U14 | — | — | — | — | — | — | — | — | — | — | — | 100 | — | — | — | — | — | — | — | — |
| | U15 | — | — | — | — | — | — | — | — | — | — | — | — | 100 | — | — | — | — | — | — | — |
| | U16 | — | — | — | — | — | — | — | — | — | — | — | — | — | 100 | — | — | — | — | — | — |
| | U17 | — | — | — | — | — | — | — | — | — | — | — | — | — | — | 100 | — | — | — | — | — |
| | U18 | — | — | — | — | — | — | — | — | — | — | — | — | — | — | — | 100 | — | — | — | — |
| | U19 | — | — | — | — | — | — | — | — | — | — | — | — | — | — | — | — | 100 | — | — | — |
| | U20 | — | — | — | — | — | — | — | — | — | — | — | — | — | — | — | — | — | 100 | — | — |
| | U21 | — | — | — | — | — | — | — | — | — | — | — | — | — | — | — | — | — | — | 100 | — |
| | U22 | — | — | — | — | — | — | — | — | — | — | — | — | — | — | — | — | — | — | — | 100 |
| Curing agents [parts by mass] | WR80-70P | 4.93 | 4.71 | 4.71 | 5.57 | 4.50 | 10.9 | 4.50 | 6.64 | 6.21 | 4.50 | 4.50 | 4.07 | — | — | — | — | — | — | — | — |
| | AQ-140 | — | — | — | — | — | — | — | — | — | — | — | — | 14.8 | 4.36 | 3.07 | 3.50 | 2.76 | 2.76 | 2.76 | 2.76 |
| Curing catalyst [parts by mass] | | 0.005 | 0.004 | 0.004 | 0.005 | 0.004 | 0.010 | 0.004 | 0.006 | 0.006 | 0.004 | 0.004 | 0.004 | 0.010 | 0.007 | 0.006 | 0.007 | 0.007 | 0.007 | 0.007 | 0.007 |
| Content of EO units (% by mass) | | 30 | 30 | 33 | 36 | 39 | 42 | 51 | 39 | 39 | 10 | 7 | 7 | 41 | 49 | 26 | 50 | 39 | 39 | 39 | 39 |
| Coating properties | | A | A | A | A | A | A | A | A | A | D | D | D | A | A | A | A | A | A | A | A |
| Tack to glass | $\times 10^{-2}$ (N/25 mm) | 2.9 | 8 | 4.6 | 7. 1 | 2.9 | 7 | 2.8 | 7.5 | 3.2 | — | — | — | 2.6 | 1 | 2.5 | 5.7 | 3.4 | 2.9 | 2.6 | 2.2 |
| | Evaluation | A | A | A | A | A | A | A | A | A | D | D | D | A | A | A | A | A | A | A | A |
| Haze | (%) | 4.75 | 2.24 | 7.95 | 3.09 | 2.47 | 2.32 | 3.67 | 3.85 | 1.97 | — | — | — | 2.17 | 2.21 | 1.63 | 5.52 | 1.48 | 1.84 | 1.72 | 1.63 |
| | Evaluation | A | A | A | A | A | A | A | A | A | — | — | — | A | A | A | A | A | A | A | A |

As shown in Table 2-1 and Table 2-2, in Production Examples 1 to 9 and 13 to 22, the result that the water solubility of the solids of the aqueous dispersion was excellent was obtained.

As shown in Table 3, in Examples 1 to 9 and Examples 13 to 20, the result that the coating properties of the pressure-sensitive adhesive composition were excellent, and the tack and transparency of the pressure-sensitive adhesive were excellent was obtained.

In contrast to this, in Examples 10 to 12, the result that the coating properties of the pressure-sensitive adhesive composition were excellent was not obtained, and the result that the tack and transparency of the pressure-sensitive adhesive were excellent was not obtained.

INDUSTRIAL APPLICABILITY

The pressure-sensitive adhesive obtained by the present invention is preferably used as a pressure-sensitive adhesive for surface protection films protecting the surfaces of flat panel displays (liquid crystal displays, organic electroluminescence displays, and the like) and touch panel displays widely used in electronic equipment such as televisions, personal computers (PCs), mobile phones, and mobile terminals, and the substrates (glass substrates, ITO/glass substrates in which ITO (indium tin oxide) films are formed on glass substrates, and the like), optical components, and the like produced or used in the production processes of these displays.

The invention claimed is:

1. An aqueous dispersion comprising a hydroxyl-terminated urethane prepolymer obtained by reacting an oxyalkylene polymer A in which an average number of hydroxyl groups per molecule is more than 2.0 and 3.0 or less, an oxyalkylene polymer B in which an average number of hydroxyl groups per molecule is 1.2 or more and 2.0 or less, and a diisocyanate compound, wherein a content proportion of oxyethylene groups to a total amount of oxyalkylene groups in the oxyalkylene polymer A is 15% by mass or more, a content proportion of oxyethylene groups to a total amount of oxyalkylene groups in the oxyalkylene polymer B is 15% by mass or more, and a content proportion of oxyethylene groups to a total amount of oxyalkylene groups in the hydroxyl-terminated urethane prepolymer is more than 20% by mass and 70% by mass or less.

2. The aqueous dispersion according to claim 1, wherein the oxyalkylene polymer A comprises an oxyalkylene polymer in which a number of hydroxyl groups is 3, and the oxyalkylene polymer B comprises an oxyalkylene polymer in which a number of hydroxyl groups is 2.

3. The aqueous dispersion according to claim 1, wherein a mass ratio of the oxyalkylene polymer A to the oxyalkylene polymer B is from 20:80 to 60:40.

4. The aqueous dispersion according to claim 1, wherein a number average molecular weight of the oxyalkylene polymer A and the oxyalkylene polymer B is 1000 to 50000.

5. The aqueous dispersion according to claim 1, wherein the content proportion of the oxyethylene groups to the total amount of the oxyalkylene groups in the hydroxyl-terminated urethane prepolymer is 23% by mass or more and 65% by mass or less.

6. The aqueous dispersion according to claim 1, wherein a weight average molecular weight of the hydroxyl-terminated urethane prepolymer is 10000 or more and 250000 or less.

7. The aqueous dispersion according to claim 1, wherein an average number of hydroxyl groups of the hydroxyl-terminated urethane prepolymer is 1.7 or more and less than 3.0.

8. A pressure-sensitive adhesive composition comprising the aqueous dispersion according to claim 1 and a polyisocyanate compound having three or more isocyanate groups in one molecule.

9. The pressure-sensitive adhesive composition according to claim 8, wherein the polyisocyanate compound having three or more isocyanate groups in one molecule is water-dispersible.

10. The pressure-sensitive adhesive composition according to claim 8, further comprising a catalyst, wherein a content of the catalyst is 0.001 parts by mass or more and 0.10 parts by mass or less based on 100 parts by mass of a total of the hydroxyl-terminated urethane prepolymer and the polyisocyanate compound having three or more isocyanate groups in one molecule.

11. A pressure-sensitive adhesive obtained by curing the pressure-sensitive adhesive composition according to claim 9.

12. A pressure-sensitive adhesive tape comprising a substrate and a pressure-sensitive adhesive layer comprising the pressure-sensitive adhesive according to claim 11 provided on at least one surface of the substrate.

* * * * *